United States Patent
Roberts et al.

(10) Patent No.: US 11,267,516 B2
(45) Date of Patent: Mar. 8, 2022

(54) HARDENED ALTERNATIVE TRAILER SYSTEM AND METHODS OF PRODUCING SAME

(71) Applicants: Justin M Roberts, Florence, MS (US); John M Hoemann, Vicksburg, MS (US); Craig R Ackerman, Gainesville, VA (US)

(72) Inventors: Justin M Roberts, Florence, MS (US); John M Hoemann, Vicksburg, MS (US); Craig R Ackerman, Gainesville, VA (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 13/886,248

(22) Filed: May 2, 2013

(65) Prior Publication Data

US 2016/0025461 A1    Jan. 28, 2016

Related U.S. Application Data

(60) Provisional application No. 61/641,877, filed on May 2, 2012.

(51) Int. Cl.

| | |
|---|---|
| *B62D 27/02* | (2006.01) |
| *B23K 31/02* | (2006.01) |
| *F41H 5/24* | (2006.01) |
| *E04H 9/10* | (2006.01) |
| *B65D 88/12* | (2006.01) |
| *E04H 1/12* | (2006.01) |

(52) U.S. Cl.
CPC ............ *B62D 27/023* (2013.01); *B23K 31/02* (2013.01); *B65D 88/121* (2013.01); *E04H 9/10* (2013.01); *F41H 5/24* (2013.01); *E04H 2001/1283* (2013.01)

(58) Field of Classification Search
CPC ...... B65D 88/121; B65D 90/12; B65D 90/20; B62D 27/023; E04H 2001/1283; E04H 9/10
USPC ......................................................... 220/1.5
See application file for complete search history.

(56) References Cited

U.S. PATENT DOCUMENTS

| 5,735,639 A * | 4/1998 | Payne .................. B65D 88/121 |
| | | 206/386 |
| 6,109,469 A * | 8/2000 | Clive-Smith ........ B65D 88/022 |
| | | 220/1.5 |
| 6,299,008 B1 * | 10/2001 | Payne .................. B65D 88/121 |
| | | 220/1.5 |
| 10,443,260 B2 * | 10/2019 | Roberts ..................... E04B 5/10 |
| 2005/0092875 A1 * | 5/2005 | Carnevali .............. F16M 11/40 |
| | | 248/160 |

(Continued)

*Primary Examiner* — Don M Anderson
(74) *Attorney, Agent, or Firm* — Brian C. Jones

(57) ABSTRACT

A Hardened Alternative Trailer System (HATS) is described, including methods of producing same. HATS has superior blast, ballistic and forced entry protection properties, relative to existing structures, due to particular features of frame design and construction methods. Furthermore, HATS is a low-cost reinforced ISO container suitable for field and/or remote fabrication and meets blast, ballistic/projectile and/or forced entry threats such as the U.S. Department of State Certification Standard SD-STD-01.01, Revision G.

20 Claims, 48 Drawing Sheets

(56) References Cited

U.S. PATENT DOCUMENTS

| | | | |
|---|---|---|---|
| 2008/0111398 A1* | 5/2008 | Stojkovic | B62D 27/023 296/203.01 |
| 2008/0169633 A1* | 7/2008 | Gabbianelli | B23K 33/008 280/781 |
| 2010/0244497 A1* | 9/2010 | Honda | B62D 21/02 296/205 |

* cited by examiner

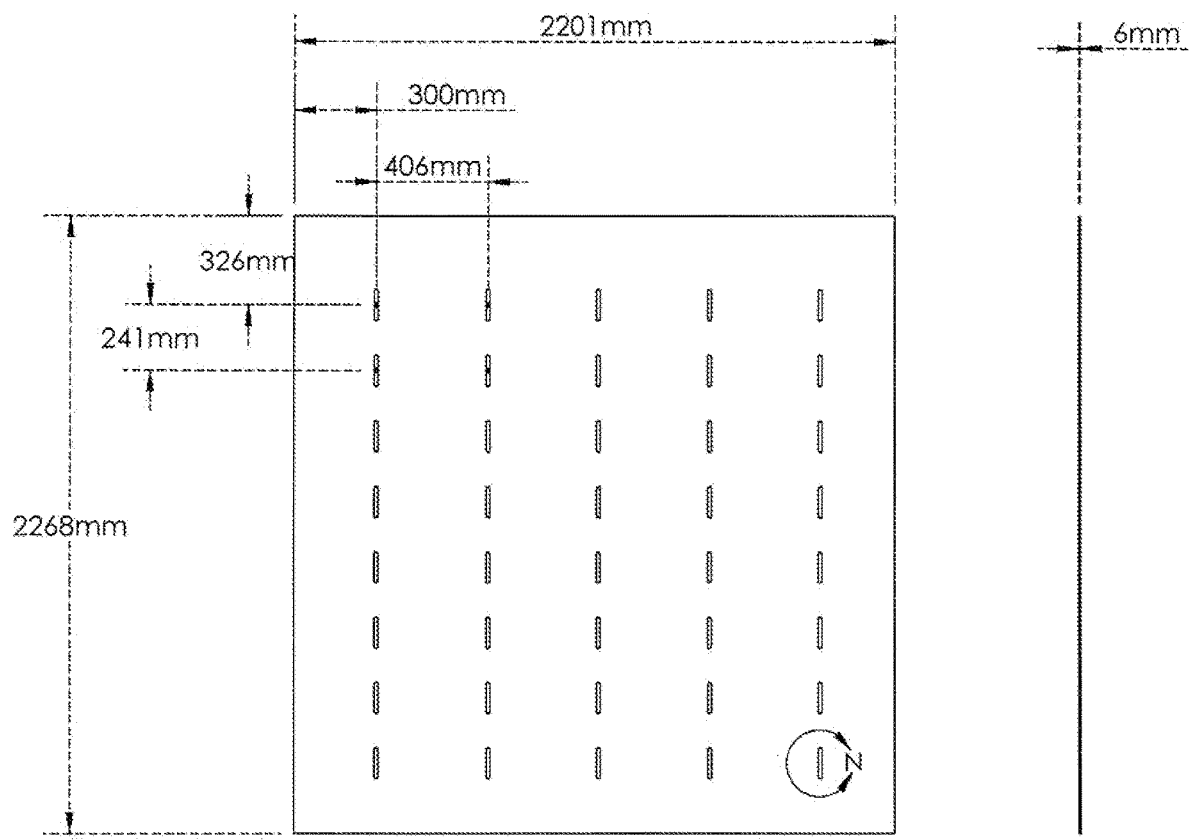
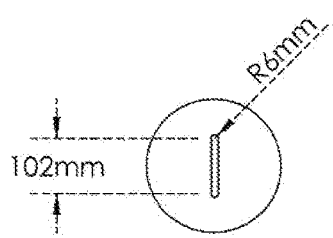
DETAIL N
SLOTTED HOLE
FIG. 18

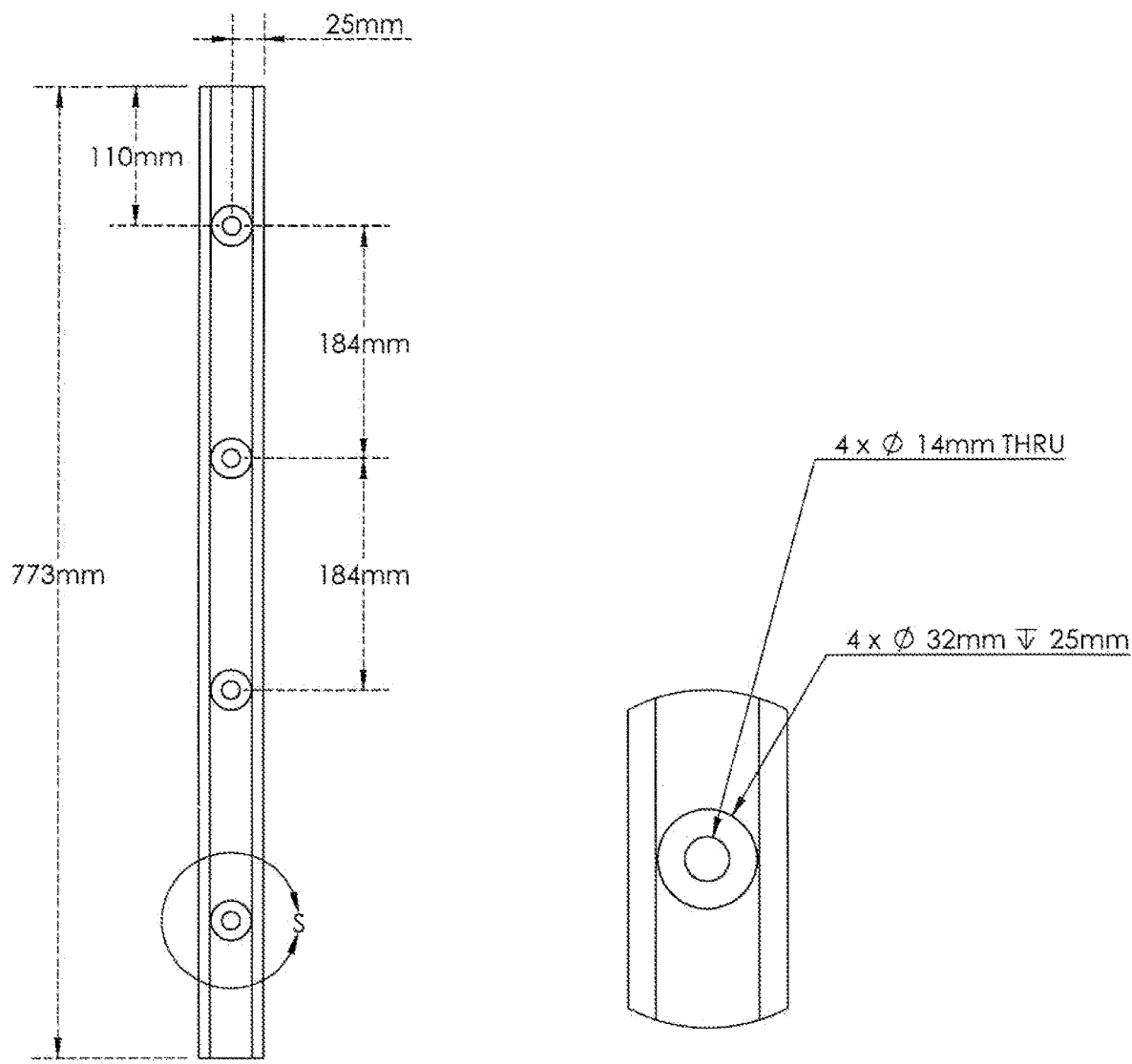
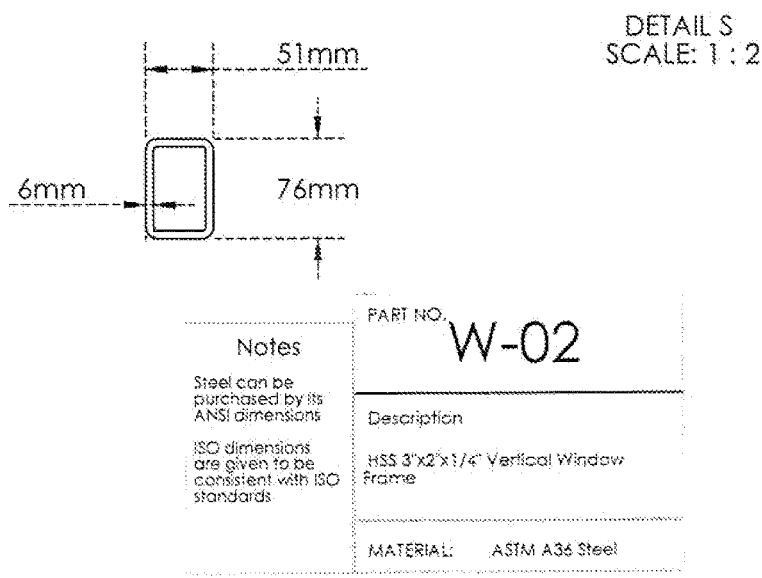
FIG. 30

HARDENED ALTERNATIVE TRAILER SYSTEM AND METHODS OF PRODUCING SAME

FIELD OF THE INVENTION

The invention relates to various embodiments of a blast, ballistic and forced entry protected structure called a HARDENED ALTERNATIVE TRAILER SYSTEM. In particular, the embodiments described herein relate to an ISO container having blast, ballistic and forced entry properties as a result of its innovative and novel design and construction. The invention also relates to methods of producing such containers.

BACKGROUND OF THE INVENTION

Protective armor typically is designed for several applications types: personal protection such as helmets and vests, vehicle protection such as for high mobility multi-wheeled vehicles (HMMWVs), and rigid structures such as buildings. The protection of troops, for example, housed in containerized housing units requires both blast and ballistic protection. Blast protection typically requires the material to have the structural integrity to withstand the high loads of blast pressure. Ballistic protection typically requires the material to stop the progress of bomb fragments ranging in size from less than one millimeter to 10 mm or more and traveling at velocities in excess of 2000 meters per second for smaller fragments.

International Organization for Standardization (ISO) containers are commonly used to house soldiers, disaster relief workers, contractors, and others where temporary and rapidly deployable shelters are used. Additionally, containers are used for mobile medical units, command and control centers, communications, equipment storage, and the like. Many of these applications are located in areas exposed to threats such as car bombs, mortars, improvised explosive devices (IEDs), small arms fire, etc. Containers converted for these applications typically do not have systems for blast and fragmentation mitigation. Many of these applications are also exposed to the threat of forced entry.

U.S. Published Patent Application 2011/10197746 proposes a design for ballistic and blast threat, but which apparently would not be resistant to forced entry as it is not mentioned. ISO containers fitted for living quarters typically provide insufficient protection to blast, ballistic/projectile and/or forced entry threats. In addition, standard ISO containers are large and require metal fabrication facilities and trained personnel to produce them. This often results in a need for remote and/or field fabrication facilities being the best means by which the containers can be economically and practically produced and delivered to the field location where they are needed.

This may create the potential for quality problems, especially in connection with highly skilled fabrication tasks such as welding. Skilled welders having adequate training and experience may not be readily available at the fabrication location if it is remote and/or in the field as opposed to a standard manufacturing facility where skilled welders are readily available.

Current ISO structure designs, especially with reinforcement for such threats, depend on skilled welders and quality assurance techniques and inspections for their manufacture. For such structure designs where the skill of the welder directly relates to the quality of the product because the strength is weld dependent, failures may occur due to poor quality welds. Quality assurance is expensive and difficult to provide in the field. Even when it is effectively utilized, rework and inspections drive the cost of such ISO containers higher and make them uneconomical and time-consuming to produce.

More expensive prefabricated units are available, for example those provided by Mifram Security at www.miframsecurity.com and marketed under the trade name GABRIEL. These may be impractical for cost concerns.

There is a need for a low-cost reinforced ISO container suitable for field and/or remote fabrication and meeting blast, ballistic/projectile and forced entry threats. Standards have been developed for forced entry and ballistic threats.

The invention provides a low-cost reinforced ISO container suitable for field and/or remote fabrication and meeting blast, ballistic/projectile and/or forced entry threats such as the U.S. Department of State Certification Standard for Forced Entry and Ballistic Resistance of Structural Systems, SD-STD-01.01, Revision G (amended) Apr. 30, 1993, the contents of which being incorporated herein by reference in their entirety.

FIG. 1 shows a prior art ISO container framework as also depicted in U.S. Published Patent Application 2011/0197746. FIG. 1 illustrates a known load-carrying element or frame 10 for box container as defined in ISO 1161. The frame 10 typically supports side walls, end walls, a floor, and a roof of the container, and is typically formed from steel. The frame 10 includes four corner posts 12, two lower side members 14, two upper side members 16, two lower side cross members 18, two upper cross members typically configured as a front upper end member 20, and a door header 22. Fork lift openings 19 are formed in the lower cross members 14. Lower corner fittings or castings 24 are attached to the lower ends of the corner posts 12 and upper corner castings 25 are attached to the upper ends of the corner posts 12.

SUMMARY OF THE INVENTION

The invention provides a hardened alternative trailer system (HATS) structure having blast, ballistic and forced entry resistance properties, said properties being present in the presence of low quality structural welds; said HATS structures comprising: a frame assembly having a frame (10), said frame including four corner posts (12), two lower side members (14), two upper side members (16), two lower cross members (18), two upper cross members (20,22), lower corner members (24) attached to the lower ends of the corner posts (12), and upper corner members (25) attached to the upper ends of the corner posts (12), said frame further comprising a plurality of vertical strengthening members 30, wherein openings (32) are present in the lower side member 14 and the upper side member 16 which receive an extended length 30U at a top end of members 30 which engages member 16 and an extended length 30L of a bottom end of members 30 which engages lower side member 14 to form two reinforced side walls.

In embodiments of the invention there are at least ten vertical strengthening members 30 in each side wall. In embodiments of the invention two upper cross members (20,22), and said two lower cross members (18) are reinforced with a plurality of vertical strengthening members 30, wherein openings are formed in the lower cross members 18 which receive an extended length 30L at a lower end of members 30, and wherein openings are formed in upper cross members (20,22) which receive an extended length 30U at a top end of members 30 to form reinforced end walls. In further embodiments of the invention an enclosed frame assembly is provided having interior and exterior wall panels forming a double walled metal panel construction on the sidewalls and end walls. Thicker metal may be used to provide enhanced safety levels where higher threat levels are present. Structural steel is used in certain embodiments of the invention.

In embodiments of the invention the enclosed frame assembly meets U.S. Department of State Certification Standard for Forced Entry and Ballistic Resistance of Structural Systems, SD-STD-01.01, Revision G (amended) Apr. 30, 1993.

In certain embodiments an enclosed frame assembly having double walled metal panel construction on the sidewalls and end walls is provided, the double-walled metal panel construction comprising single pieces for each of said sidewalls and end wall flat surface layers, wherein said exterior single pieces are welded to the structure from the inside of the structure, and wherein said interior pieces for said sidewalls and end wall flat surface layers have pre-manufactured openings aligned with underlying frame structure and are plug welded.

Methods of manufacturing a hardened alternative trailer system (HATS) structure having blast, ballistic and forced entry resistance properties are also provided in accordance with embodiments of the invention, these properties being present in the presence of low quality structural welds. The method comprises the steps of (i) providing a frame assembly having a frame (10), said frame including four corner posts (12), two lower side members (14), two upper side members (16), two lower cross members (18), two upper cross members (20,22), lower corner members (24) attached to the lower ends of the corner posts (12), and upper corner members (25) attached to the upper ends of the corner posts (12), (ii) providing a plurality of vertical strengthening members 30 having extended lengths 30U at a top end and extended lengths 30L at a bottom end, (iii) providing openings (32) in the lower side member 14 and the upper side member 16, (iv) engaging extended lengths 30U at a top end of members 30 into said openings 32 in member 16, (v) engaging extended lengths 30L at a corresponding bottom end of members 30 into said openings 32 in member 14 such that vertical strengthening members 30 have a vertical orientation, and (vi) welding said vertical strengthening members 30 at every point of engagement with members 14 and 16 to form two reinforced side walls.

BRIEF DESCRIPTION OF THE DRAWINGS

FIGS. 5-32 show a complete set of fabrication drawings for pieces used to build an embodiment of the invention, specifically;

FIG. 5 shows isometric views of corner extension (A-01), base frame mounting bracket (A-02), base frame mounting bracket (A-03), right corner casting (C-01) and left corner casting (C-02).

FIG. 6 shows side and plan views of an exterior front piece with window cutout in accordance with an embodiment of the invention.

FIG. 7 shows side and plan views of an exterior sidewall in accordance with an embodiment of the invention.

FIG. 8 shows a plan view of an exterior top, including a detail of a slotted hole in accordance with an embodiment of the invention.

FIG. 9 shows side and plan views of an exterior end piece in accordance with an embodiment of the invention.

FIG. 10 shows side and plan views of an extension cap in accordance with an embodiment of the invention.

FIG. 11 shows a side and end view, as well as a detail of a hole in top of same, of a bottom front frame member in accordance with an embodiment of the invention.

FIG. 12 shows a side and end view, as well as a detail of a hole in top of same, of a bottom side frame member in accordance with an embodiment of the invention.

FIG. 13 shows a side and end view, as well as a detail of a hole in top of same, of a bottom end frame member in accordance with an embodiment of the invention.

FIG. 14 shows side and end views of a bottom frame longitudinal bar (F-06), a bottom frame crossbar (F-07), and a floor support angle (F-08) in accordance with an embodiment of the invention.

FIG. 15 shows an exterior vertical door trim (EXT-01), an exterior horizontal door trim (EXT-02), an end insertion for end frame member (F-01) and a 3×2×⅛ "L" (F-08A) in accordance with an embodiment of the invention.

FIG. 16 shows a plan view and a side view, as well as a detail of a slotted hole, of an interior wall in accordance with an embodiment of the invention.

FIG. 17 shows an interior floor (INT-02) and an interior ceiling (INI-03) in accordance with an embodiment of the invention.

FIG. 18 shows a plan view and a side view, as well as a detail of a slotted hole, of an interior back in accordance with an embodiment of the invention.

FIG. 19 shows a compartment wall door trim (INT-05), a compartment wall door header trim (INT-06), and a door jam for 8 inch frame including end view in accordance with an embodiment of the invention.

FIG. 20 shows a plan view and a side view, as well as a detail of a slotted hole, of a compartment wall plate in accordance with an embodiment of the invention.

FIG. 21 shows a plan view, and a detail of a slotted hole in same, of an interior front wall with window cutout in accordance with an embodiment of the invention.

FIG. 22 shows side and end views of an interior wall stud (INT-S-01), a compartment wall door header (FNT-S-02) and a window bottom stud (S-06) in accordance with an embodiment of the invention.

FIG. 23 shows side and end views of a stud for ¼ inch plate (S-05) and a window header (S-07) in accordance with an embodiment of the invention.

FIG. 24 shows side and end views of a window top stud (S-08), a door header beam (S-09-01) and a corner stud (S-44) in accordance with an embodiment of the invention.

FIG. 25 shows a side and end view, including a detail of hole in top of same, of a side top frame (TF-02) in accordance with an embodiment of the invention.

FIG. 26 shows a side and end view, including a detail of hole in top of same, of a back end base frame (TF-03) in accordance with an embodiment of the invention.

FIG. 27 shows side and end views of a middle base frame (TF-04) and a longitudinal bar (TF-05) in accordance with an embodiment of the invention.

FIG. 28 shows a side and end view, including a detail of hole in top of same, of a top front end base frame (TF-06) in accordance with an embodiment of the invention.

FIG. 29 shows a side and end view, including a detail, of a horizontal window frame (W-01) in accordance with an embodiment of the invention.

FIG. 30 shows a side and end view, including a detail, of a vertical window frame (W-02) in accordance with an embodiment of the invention.

FIG. 31 shows vertical window molding (W-03) in accordance with an embodiment of the invention.

FIG. 32 shows horizontal window molding (W-04) in accordance with an embodiment of the invention.

FIG. 36 further shows Item Numbers 1-7 and their relationship in the assembly of the structure in accordance with an embodiment of the invention.

DETAILED DESCRIPTION OF THE INVENTION

Figure 1:
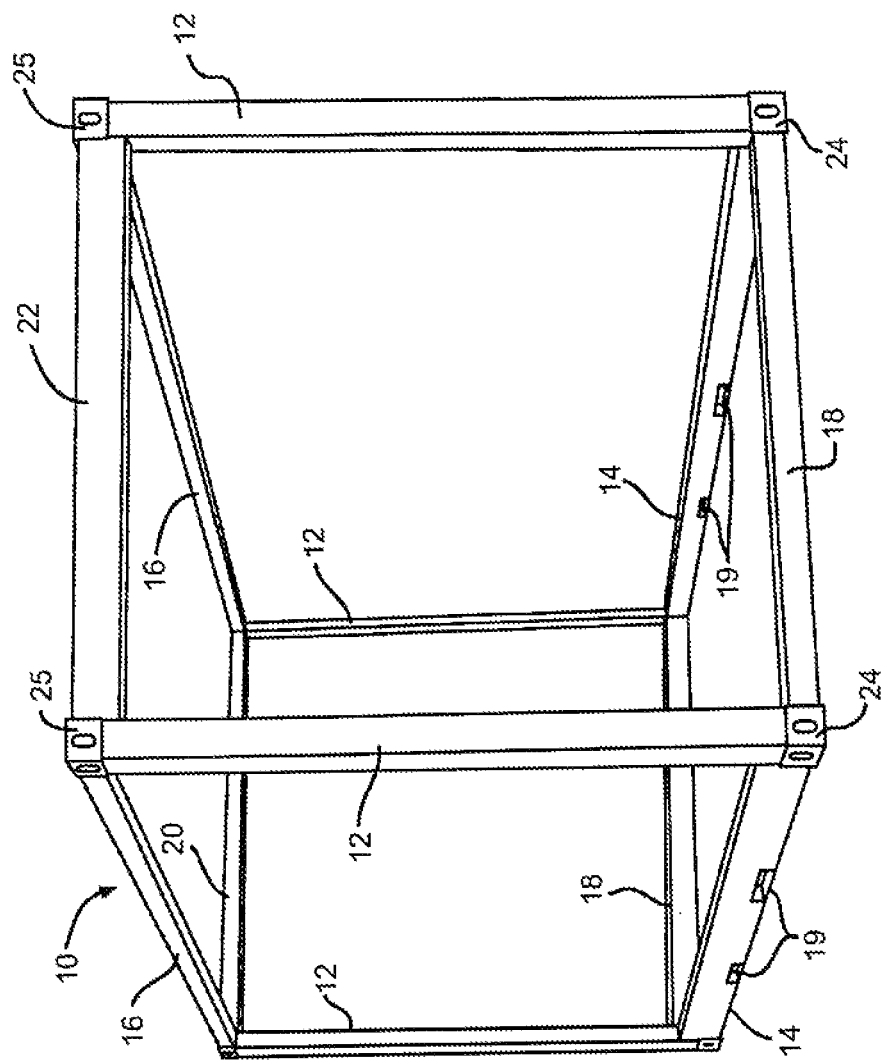
FIG. 1 shows a conventional ISO container framework.
Figure 2:
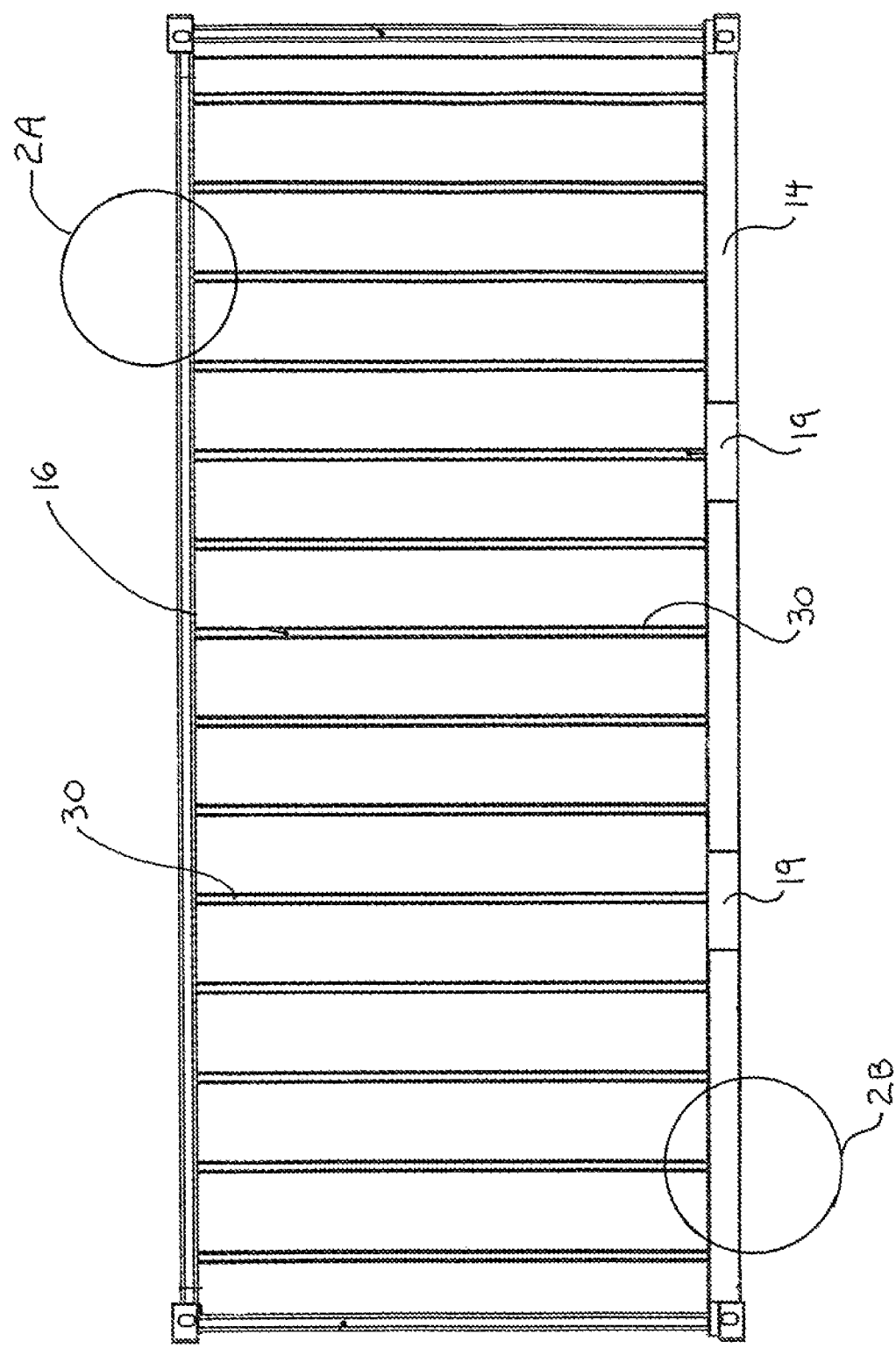
FIG. 2 shows a side wall view of the frame in accordance with an embodiment of the invention.

FIG. 2 shows a side wall view of the frame in accordance with the invention. The ISO frame in accordance with the invention includes vertical strengthening members 30 (14 shown in FIG. 2). Vertical strengthening members 30 are a part of the novel and innovative design wherein openings are formed in the lower side member 14 and the upper side member 16 which receive an extended length at both the top end of member 30 which engages member 16 and an extended length of the bottom end of member 30 which engages lower side member 14. These features are not specifically shown in FIG. 2 and are described in greater detail below.

Figure 2A:
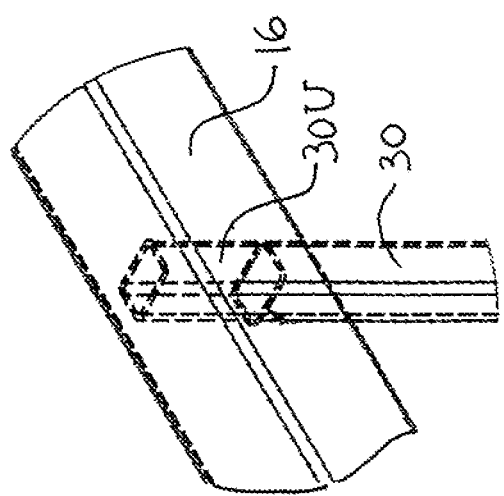
FIG. 2A shows an isometric view of a hollow upper side member with an opening receiving an extended length of a vertical strengthening member in accordance with an embodiment of the invention.
Figure 2B:
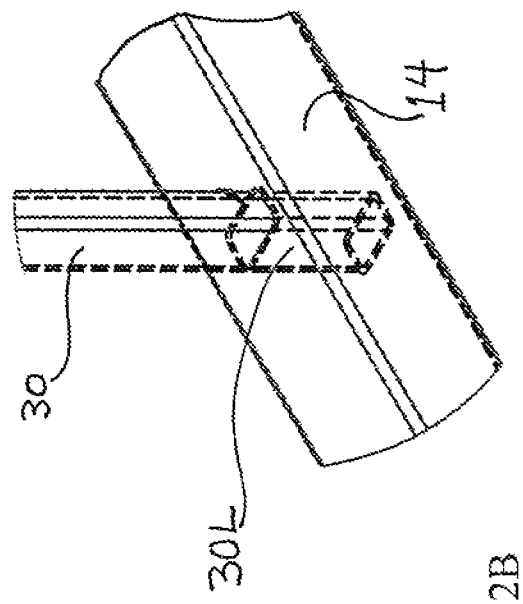
FIG. 2B shows an isometric view of a hollow lower side member with an opening receiving an extended length of a vertical strengthening member in accordance with an embodiment of the invention.

FIGS. 2A and 2B show the design in accordance with the invention (for one vertical strengthening member 30) wherein the upper side member 16 is hollow and has an opening formed therein which receives an extended length 30U at the top end of member 30 that engages member 16 in the manner shown by extending into the interior cavity of upper side member 16. FIG. 2B shows the design in accordance with the invention wherein the lower side member 14 is hollow and has an opening formed therein which receives an extended length 30L at the lower end of member 30 that engages lower side member 14 in the manner shown by extending into the interior cavity of lower side member 14.

In this manner, even if a weld attaching vertical strengthening member 30 to lower side member 14 or a weld attaching vertical strengthening member 30 to the upper side member 16 is defective or even fails, the ISO container structure in accordance with the invention maintains sufficient structural integrity to resist ballistic, blast and/or forced entry threats. The engagement and attachment between the opening in the hollow upper side member 16 and the extended length 30U at the top end of member 30 is sufficiently strong, even without a structural quality weld attaching member 30 to member 16, to provide a wall structures with suitable blast, ballistic and forced entry protection performance. Similarly, the engagement and attachment between the opening in the hollow lower side member 14 and the extended length 30L at the bottom end of member 30 is sufficiently strong, even without a structural quality weld attaching member 30 to member 14, to provide a wall structures with suitable blast, ballistic and forced entry protection performance.

Furthermore, in embodiments of the invention, the need for skilled welders, quality assurance techniques and inspections for the manufacture of structures with suitable blast, ballistic and forced entry protection performance is lessened, or in certain instances, can be eliminated. The structure design in accordance with the invention is not reliant on the skill of the welder in order to produce a high quality of the product. The performance of the structure is not weld dependent, so even if weld failures occur and/or are present at fabrication, the structure in accordance with the invention is sufficiently robust to have the required blast, ballistic and forced entry protection performance. Expensive Quality Assurance ("QA"), difficult to provide in the field, is minimized or eliminated. Accordingly, expensive, time-consuming and uneconomical rework and QA inspections are also eliminated, which drive the cost of such ISO containers higher and make them uneconomical and time-consuming to produce.

Any number of vertical strengthening member members 30 may be used to manufacture a wall in accordance with the invention, and they may be used on any and all four vertical walls of the ISO container structure in accordance with the invention. In embodiments of the invention the vertical strengthening member members 30 may be on 12" centers, 14" centers, 16" centers, 18" centers or any spacing. In embodiments of the invention vertical strengthening member members 30 are spaced at a distance on the order of from about 10" to about 30" center to center, which provides either the optimum strength, an economical balance between strength and fabrication costs and complexity, or satisfactorily meets some other design criteria.

Figure 3:
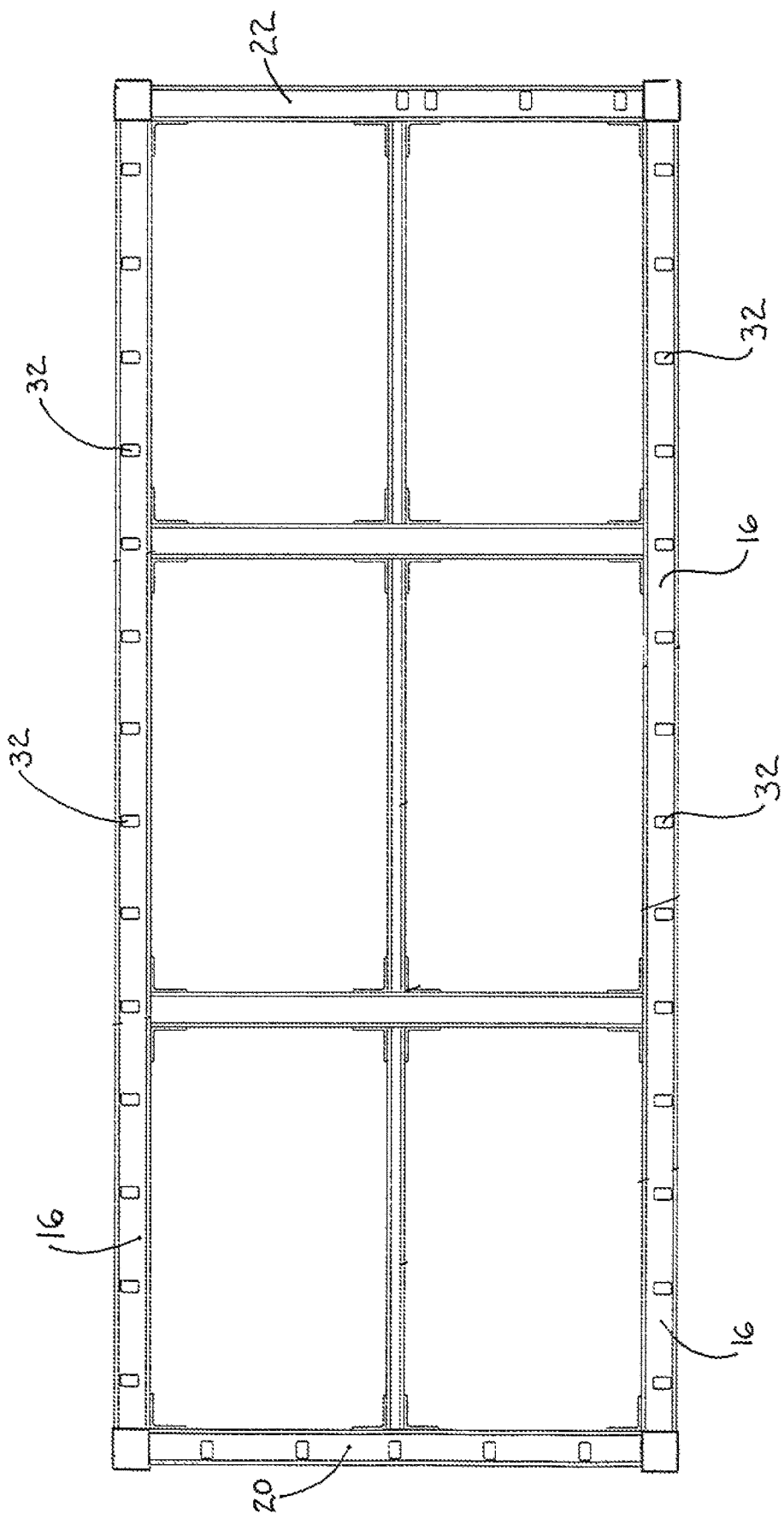
FIG. 3 shows an upper roof frame in accordance with an embodiment of the invention.
Figure 35:
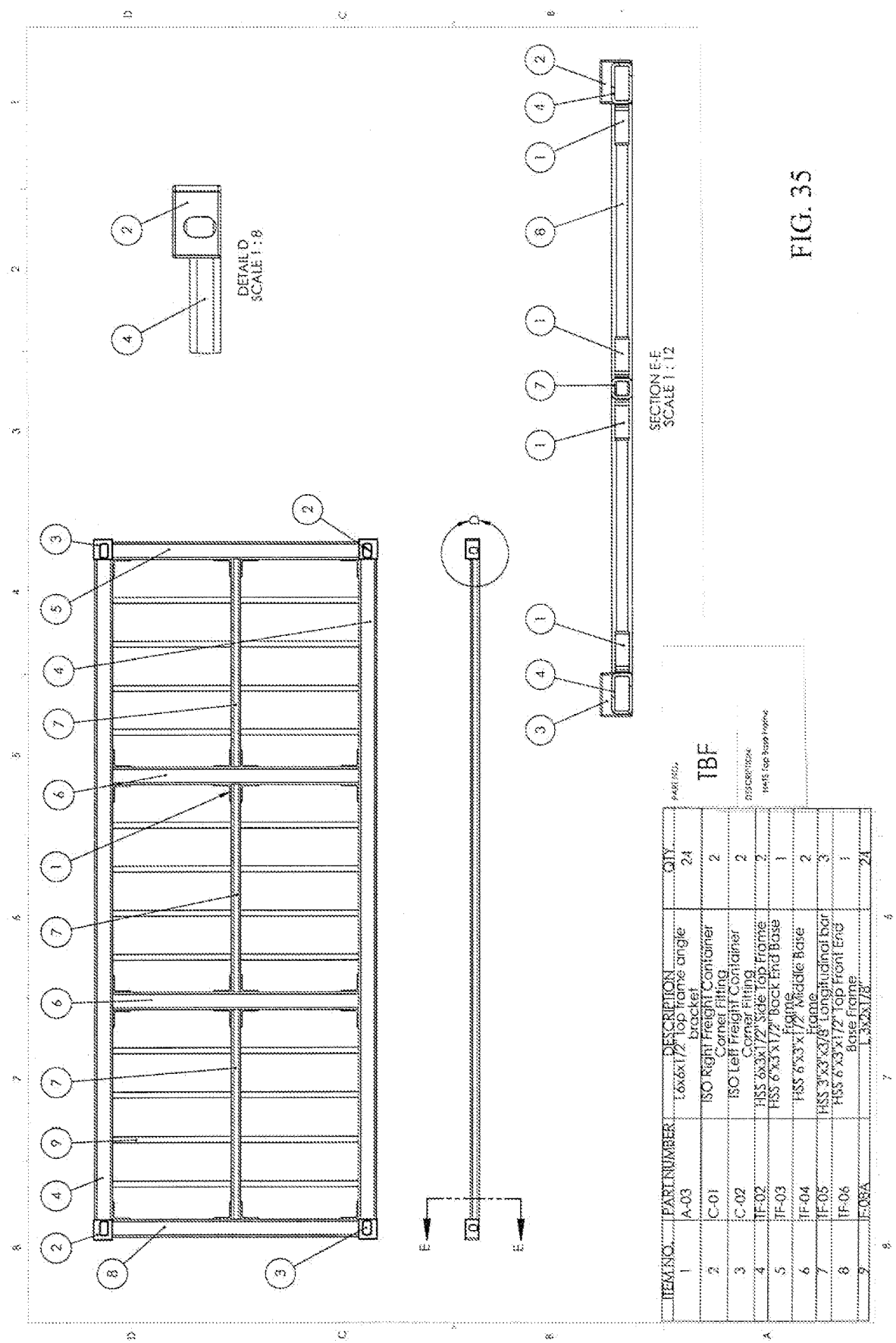
FIG. 35 shows a plan, side and section assembly drawings for the top base frame (TBF) having Item Numbers 1-9, also includes a corner detail and shows the relationship of each of the parts on the incorporated parts table.

FIG. 3 shows the upper roof frame in accordance with one embodiment of the invention having a side door, and also shows the openings 32 (37 shown) formed to receive extended length(s) 30U of individual vertical strengthening member members 30 (not shown). As shown in FIG. 3, there are 14 openings in each of the two upper side members 16, 4 openings in upper end member 20 and 4 in upper end member 22. The openings in upper end member 22 are of a spacing chosen to accommodate a door opening when the upper roof frame is incorporated into a completed structure. In embodiments of the invention the upper roof frame (or top frame) may be additionally reinforced as is shown in FIG. 35 wherein an additional 24 reinforcing members (designated Item #9, Part F-08A) are added to the framework. FIG. 35 depicts a view from the top, and accordingly, the openings therein for receiving the extended length 30U at the top end of member 30 are not shown.

Figure 34:
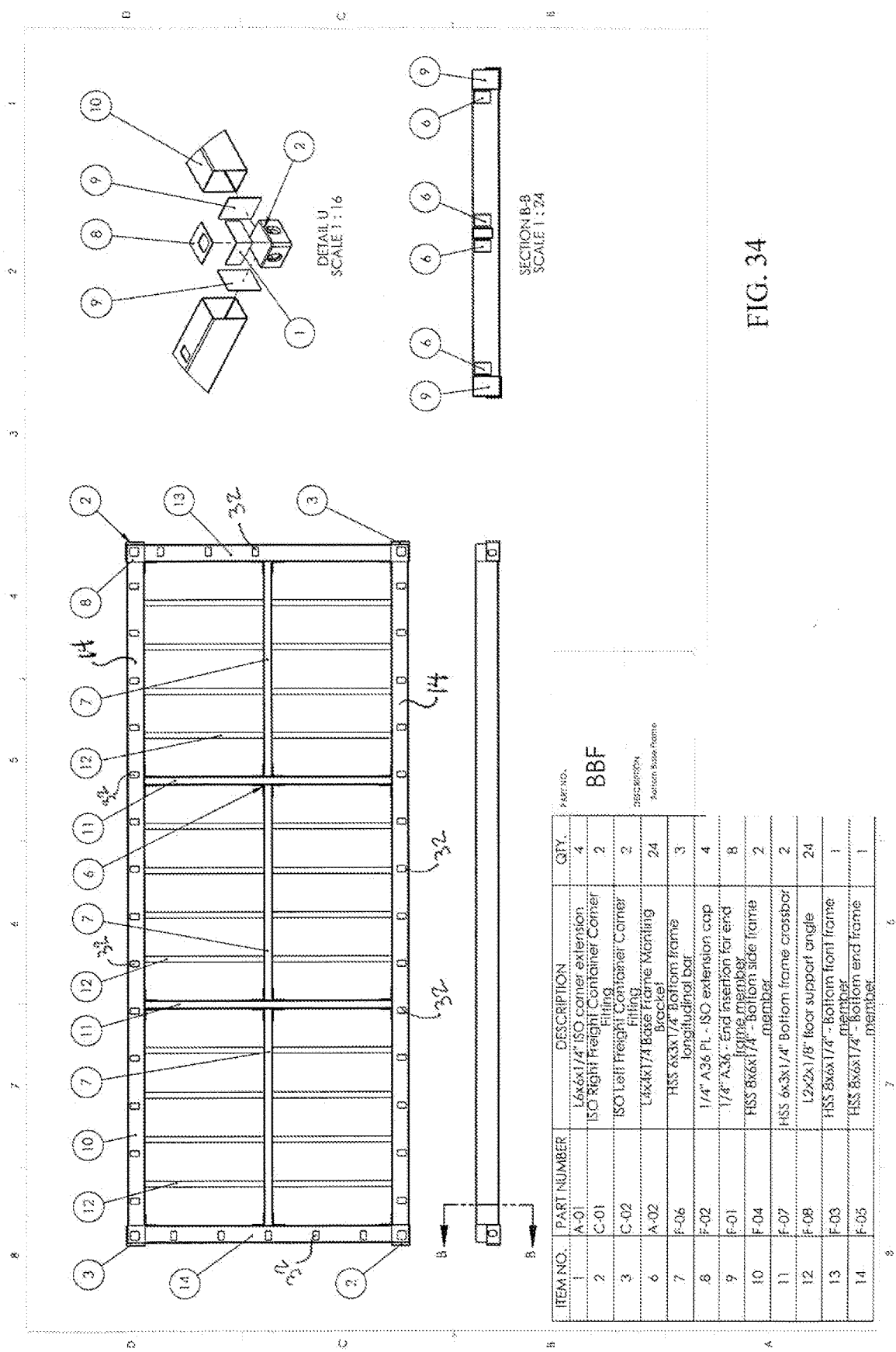
FIG. 34 shows a plan, side and section assembly drawings for the bottom base frame (BBF) having Item Numbers 1-14, also includes an isometric corner detail and shows the relationship of each of the parts on the incorporated parts table.

FIG. 34 shows the bottom base frame (BBF) in accordance with one embodiment of the invention having a side door, and also shows the openings 32 (36 shown) formed to receive extended length(s) 30L of individual vertical strengthening member members 30 (not shown). As shown in FIG. 34, there are 14 openings in each of the lower side members 14 (designated Item #10, Part F-04), as well as openings in lower end members 18 (designated individually as Items 13 & 14, Part Nos. F03 and F05, respectively). In embodiments of the invention the bottom base frame may be additionally reinforced as is shown in FIG. 34 wherein an additional 24 reinforcing members are added to the framework. FIG. 34 also depicts an embodiment wherein no fork lift channels are present.

Figure 4:
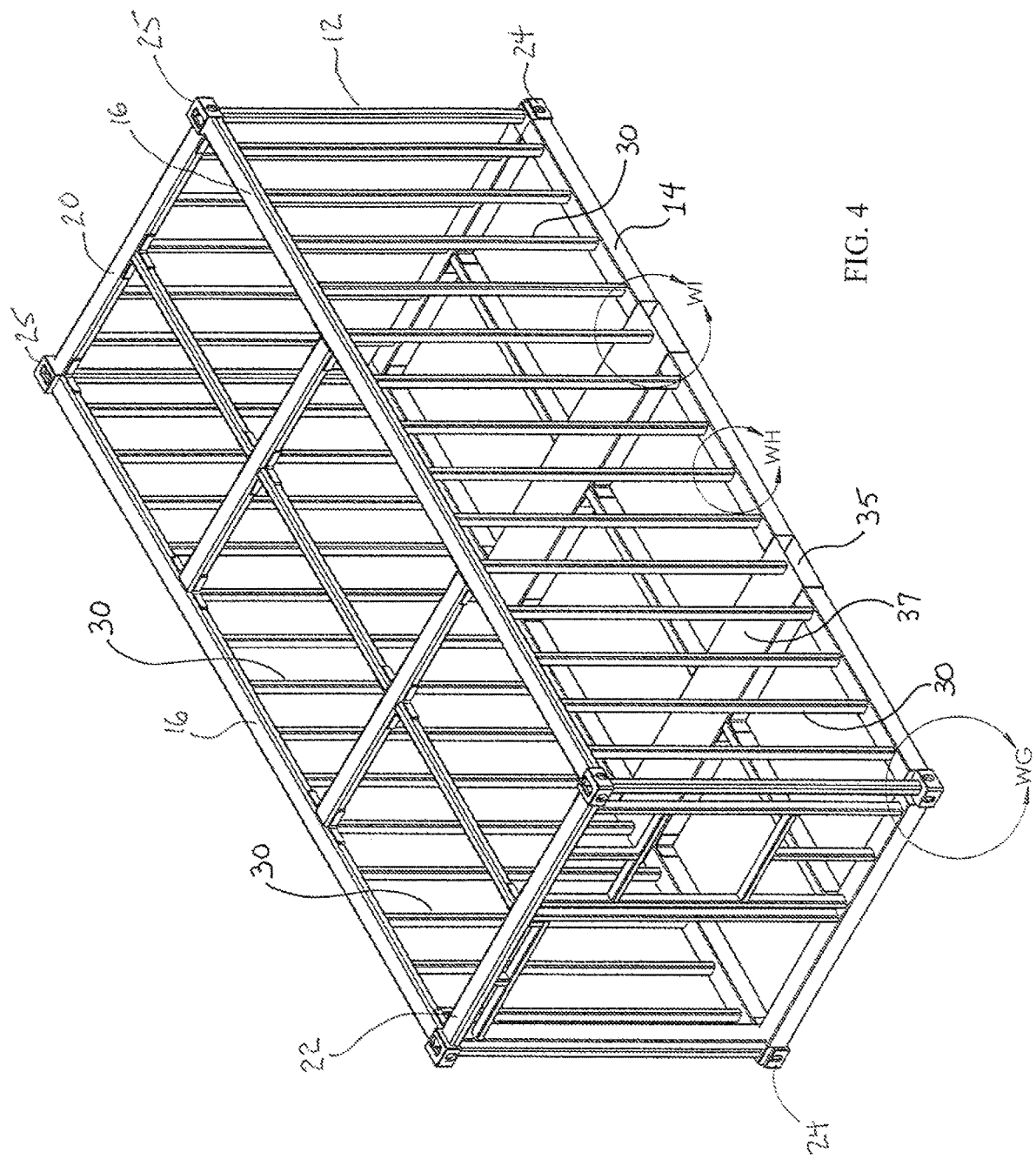
FIG. 4 shows an isometric view of an ISO container frame in accordance with an embodiment of the invention.
Figure 5:
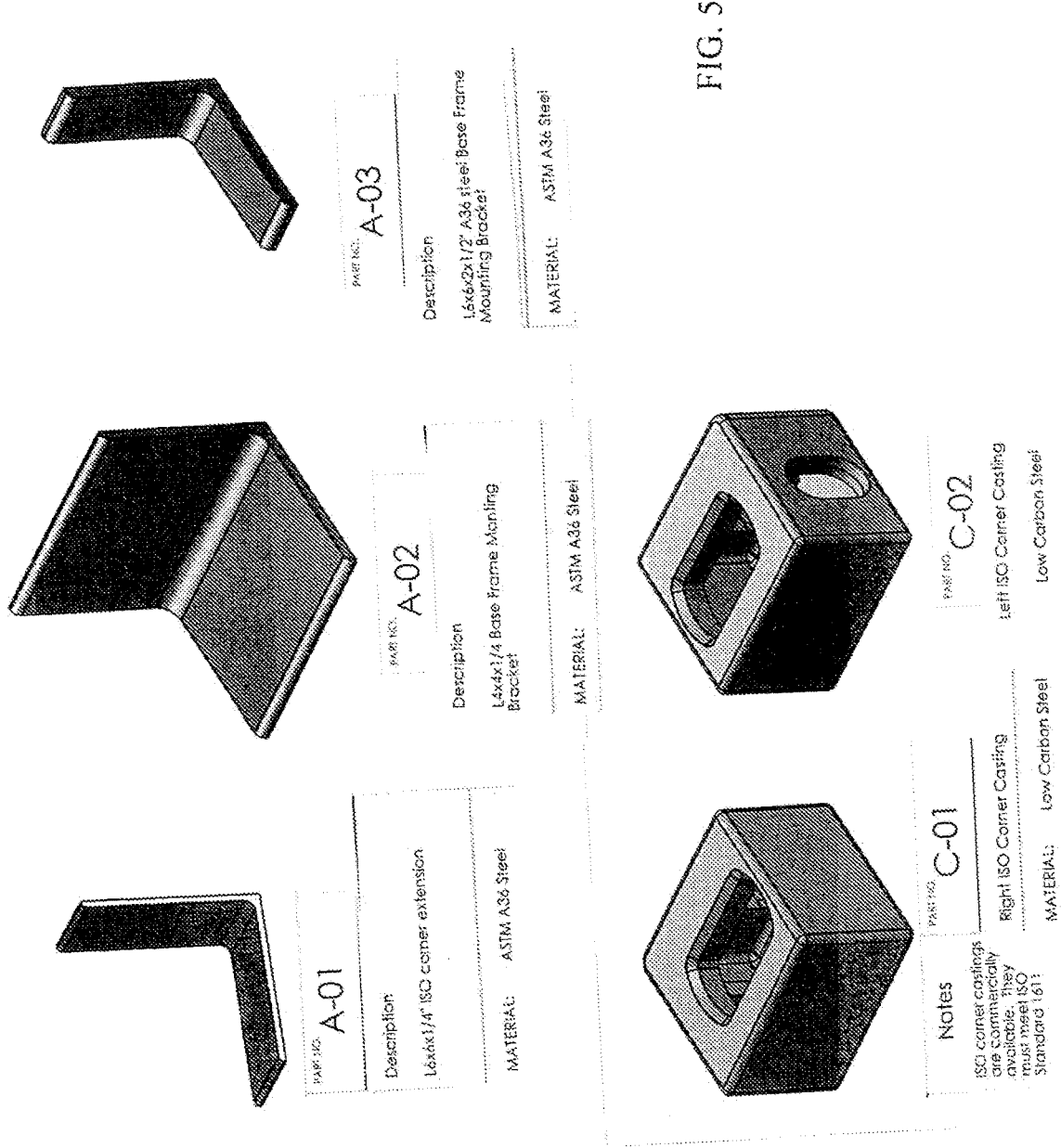
Figure 6:
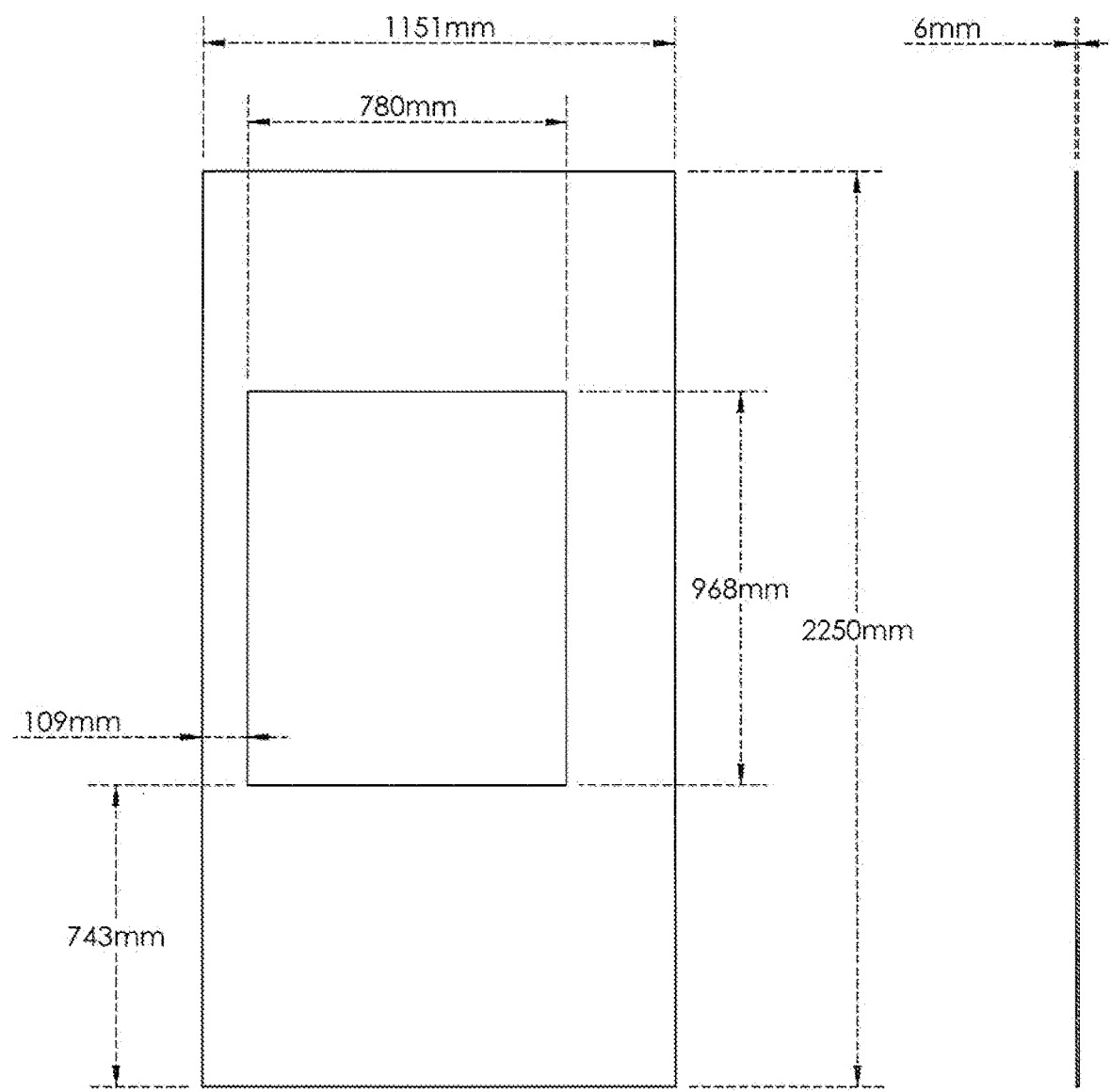
Figure 7:
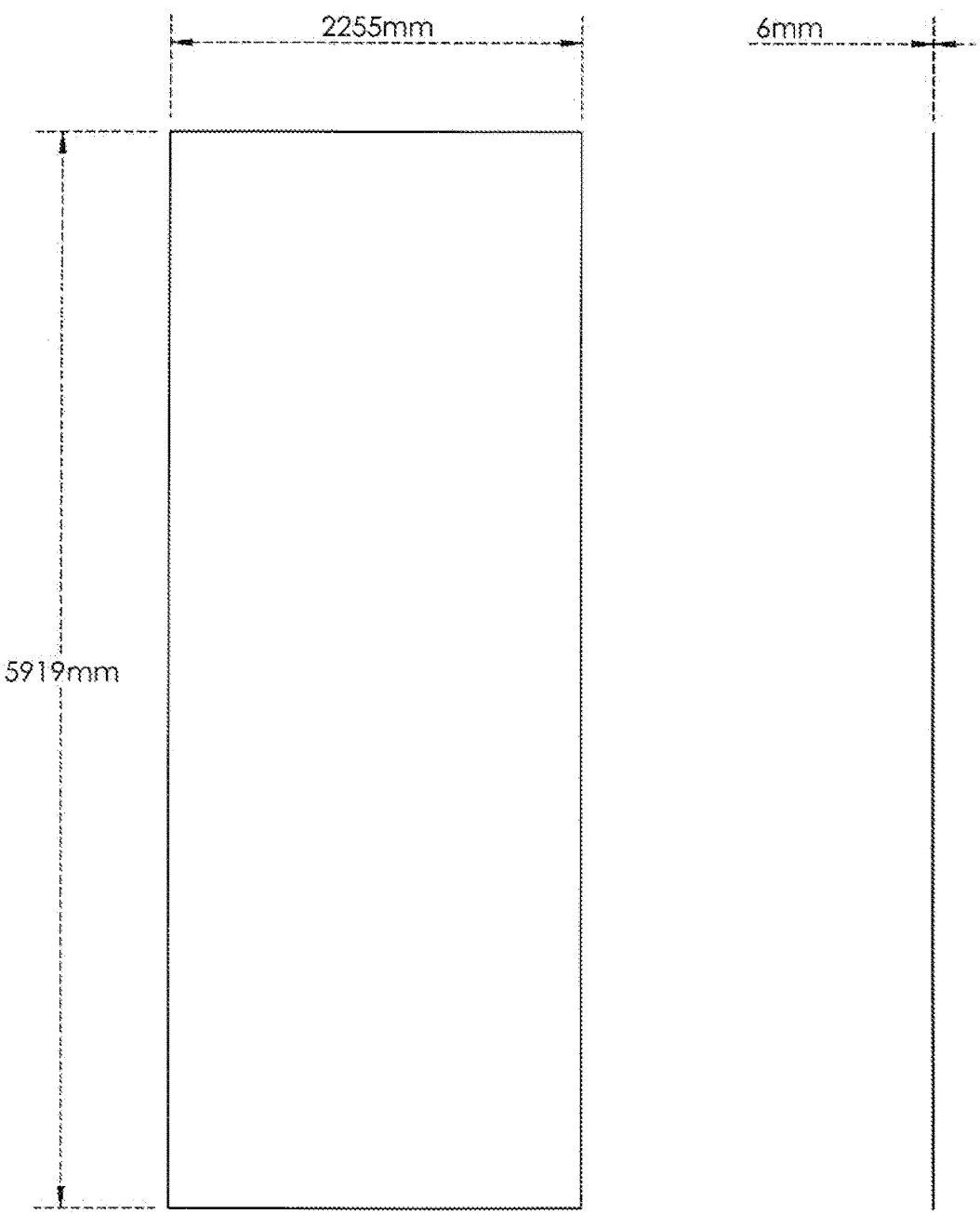
Figure 8:
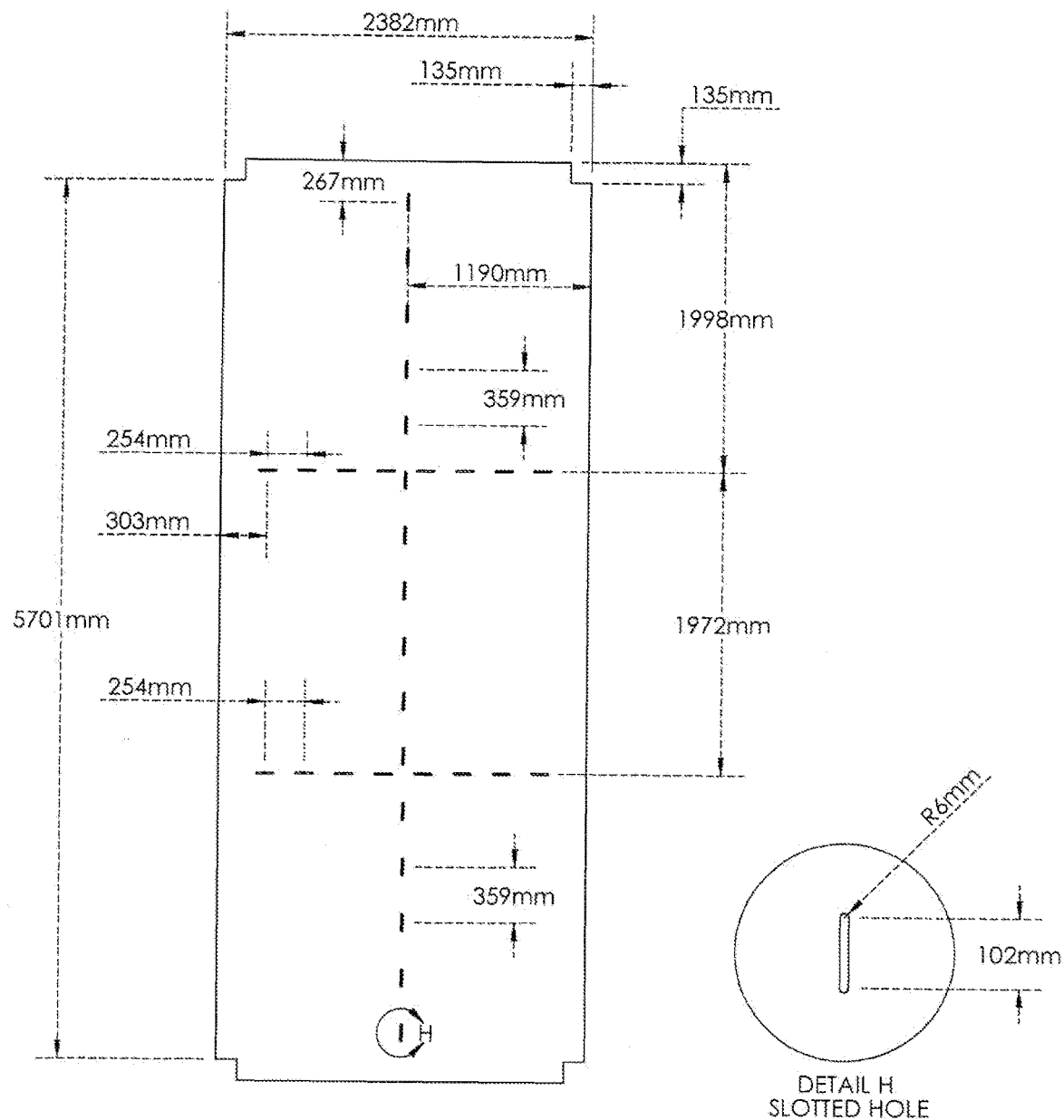
Figure 9:
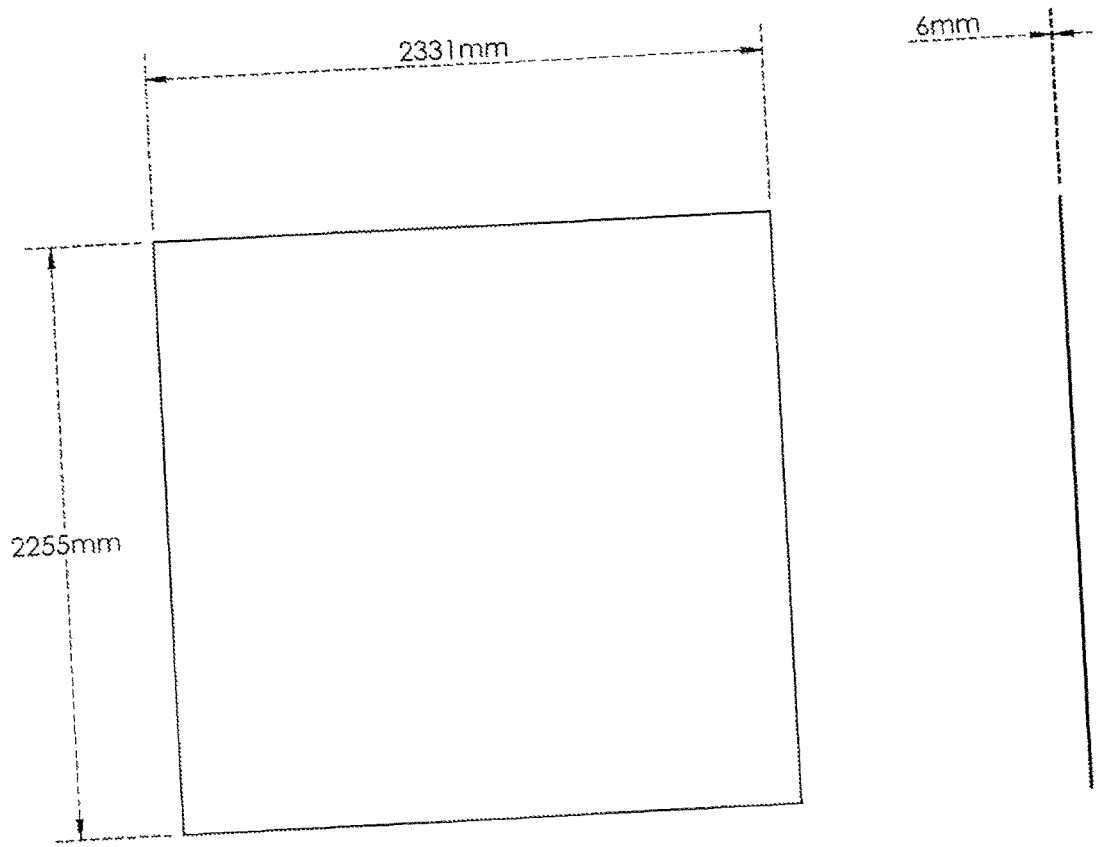
Figure 10:
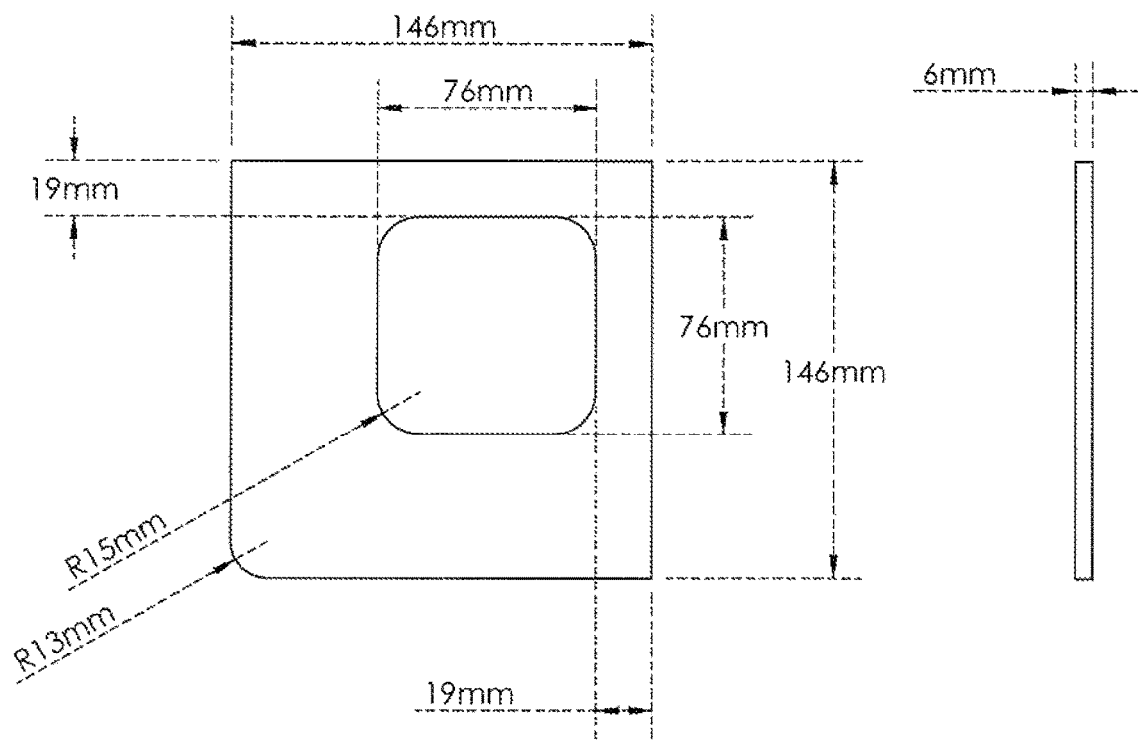
Figure 11:
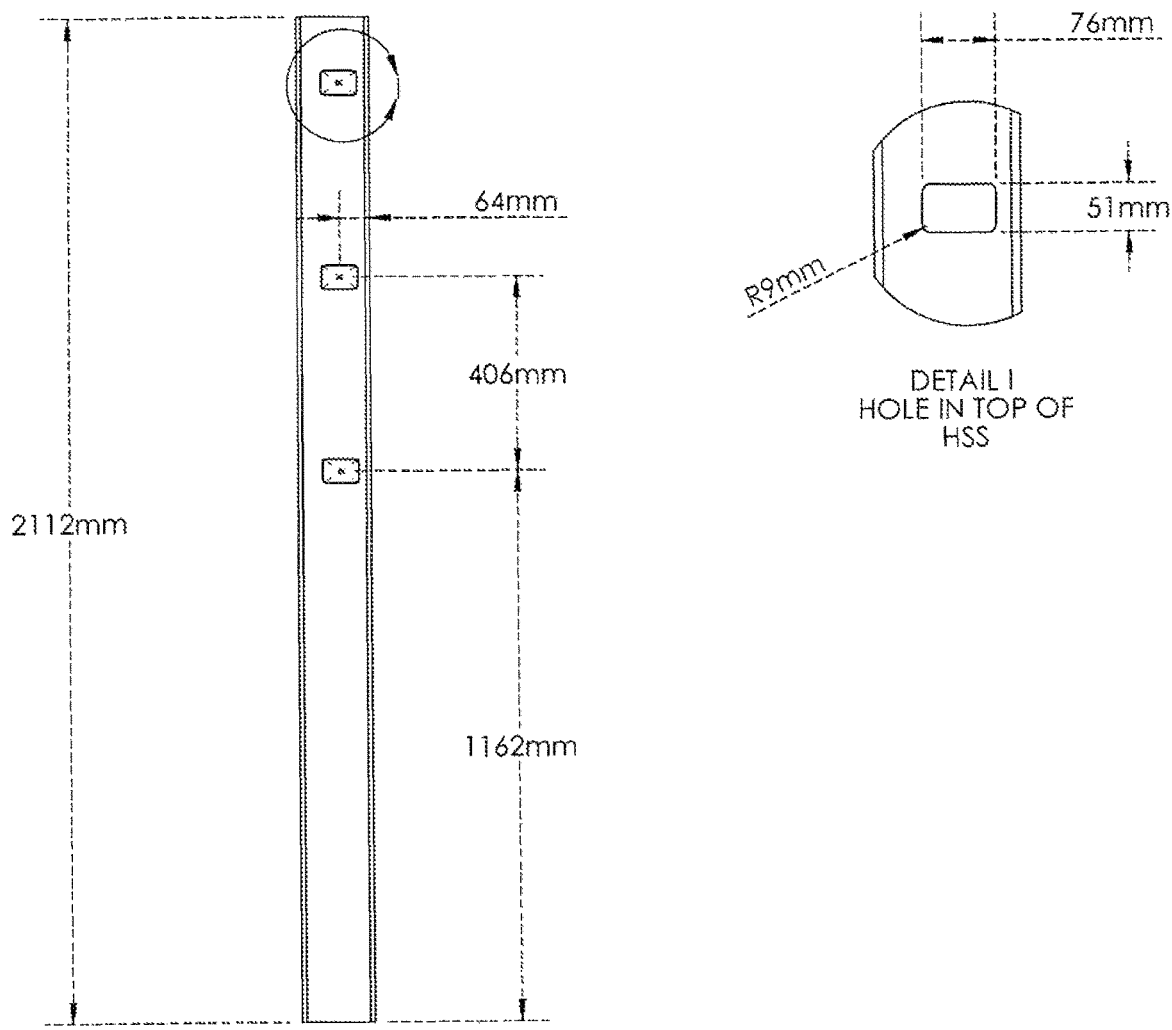
Figure 12:
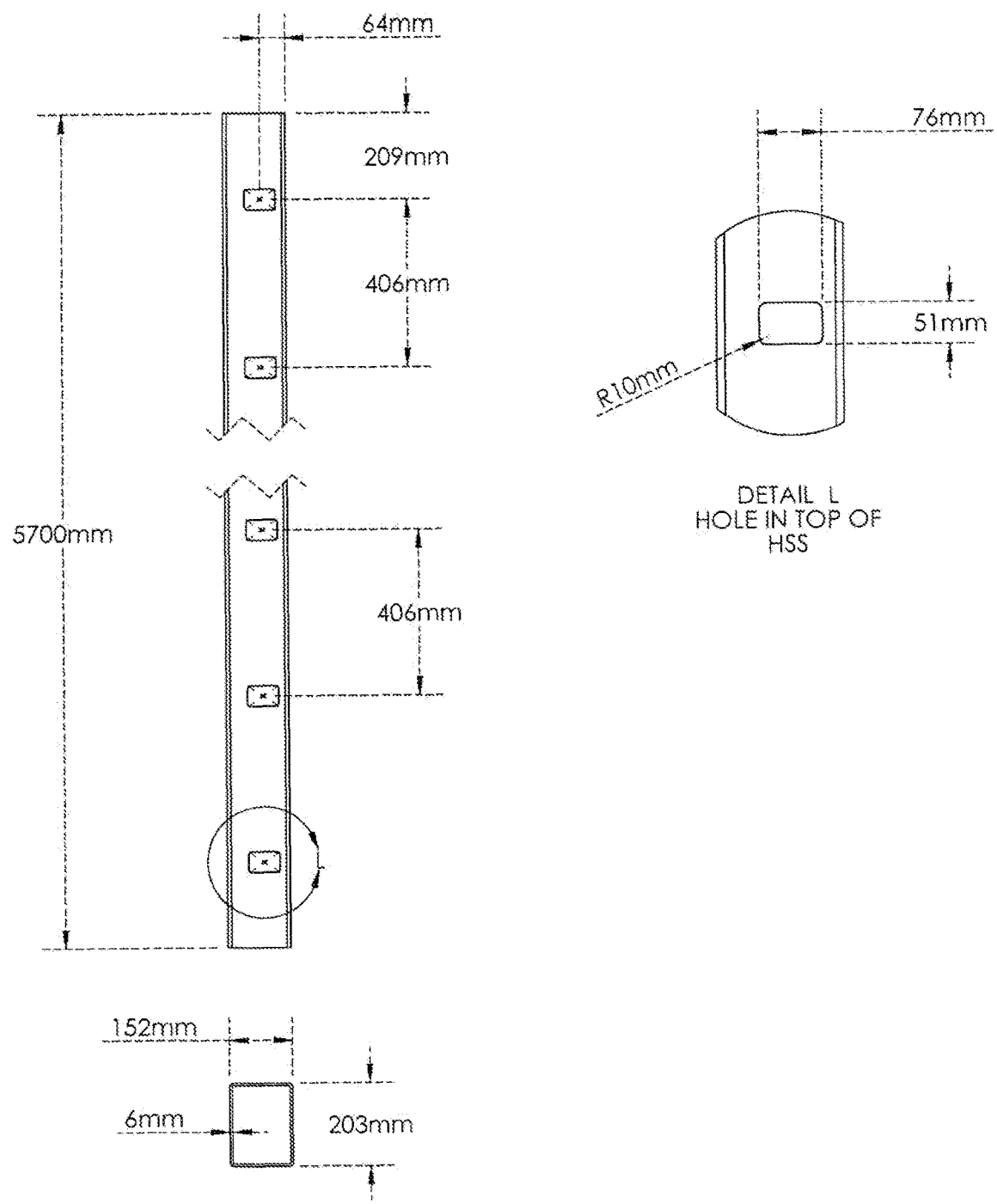
Figure 13:
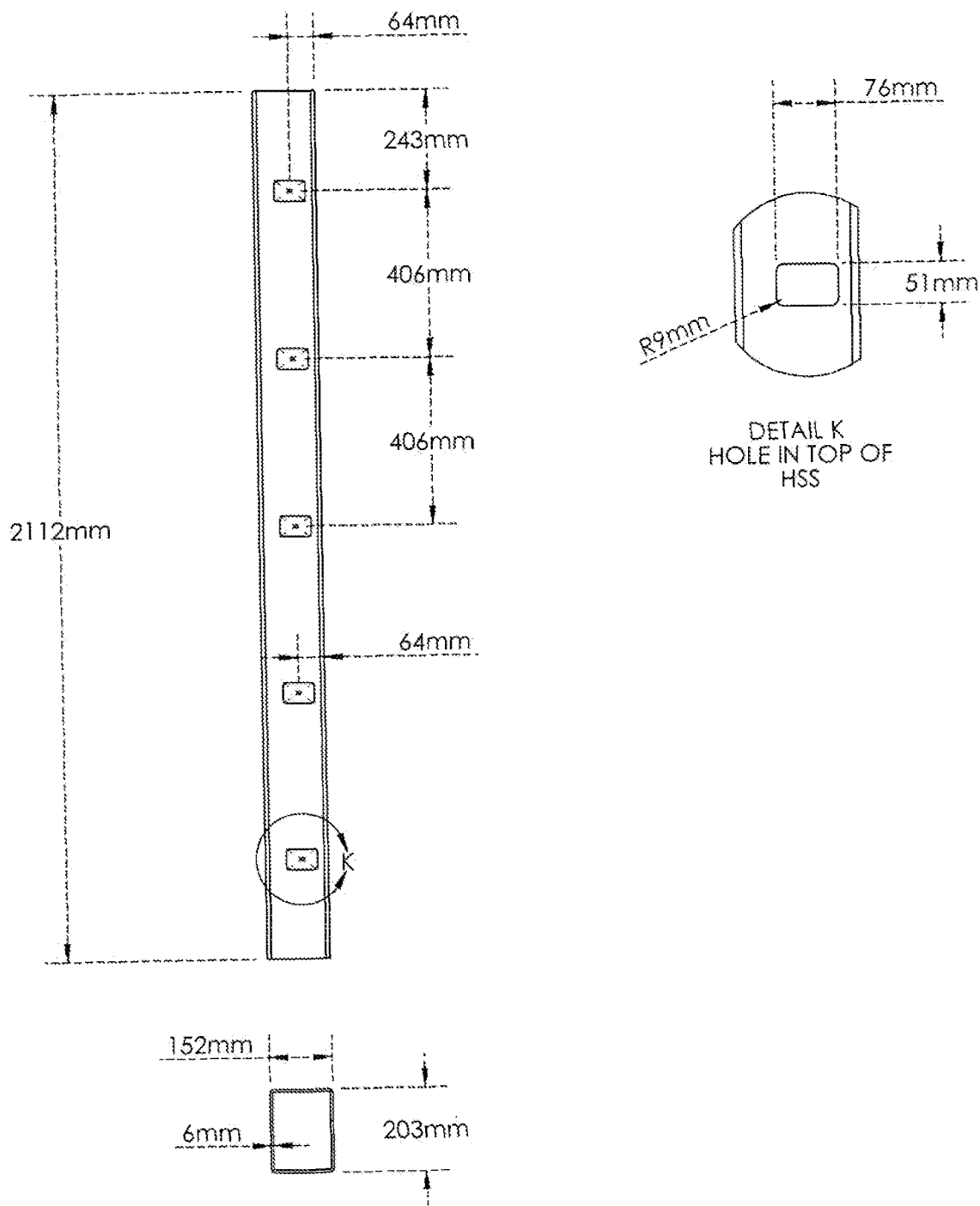
Figure 14:
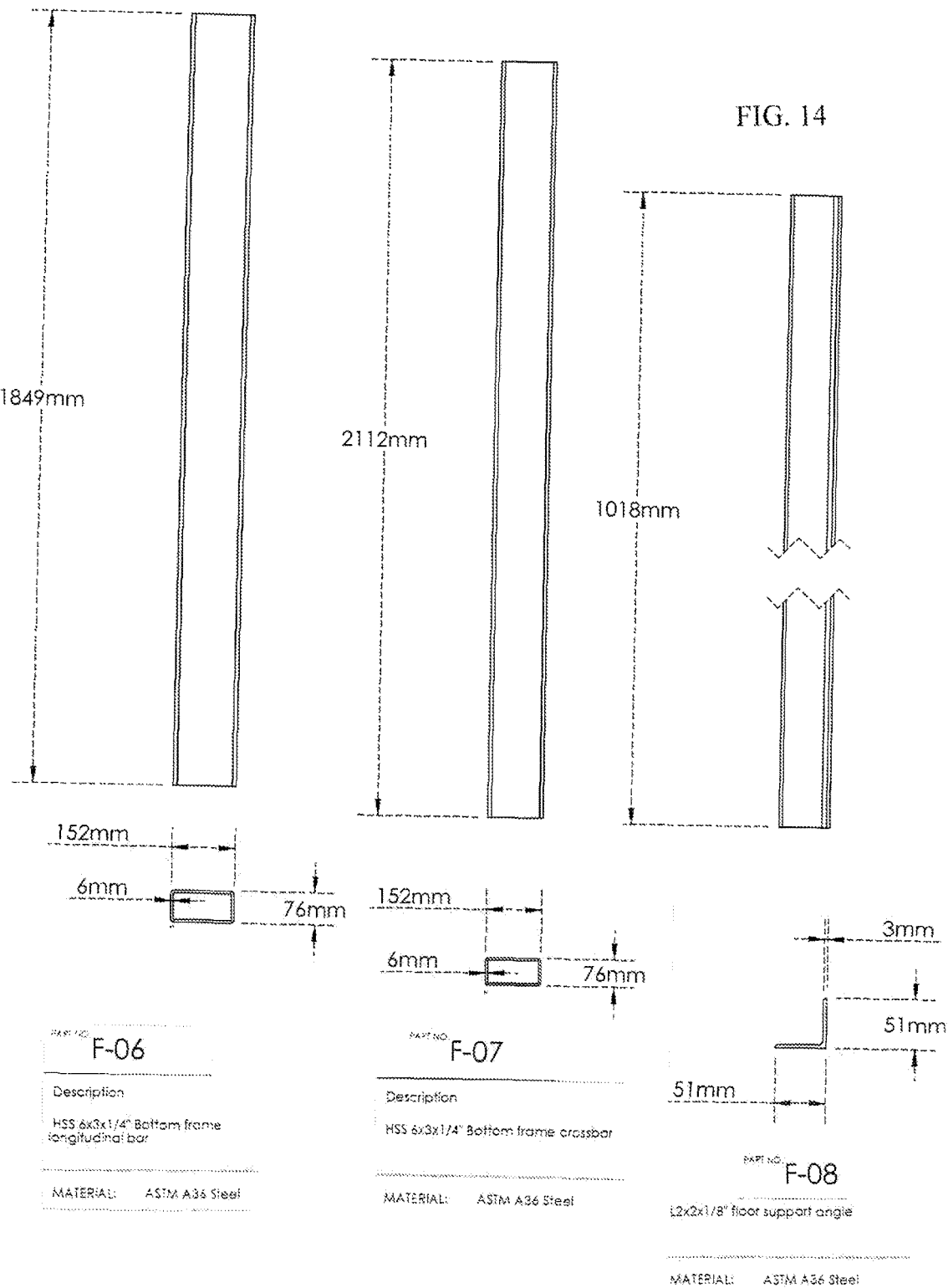
Figure 15:
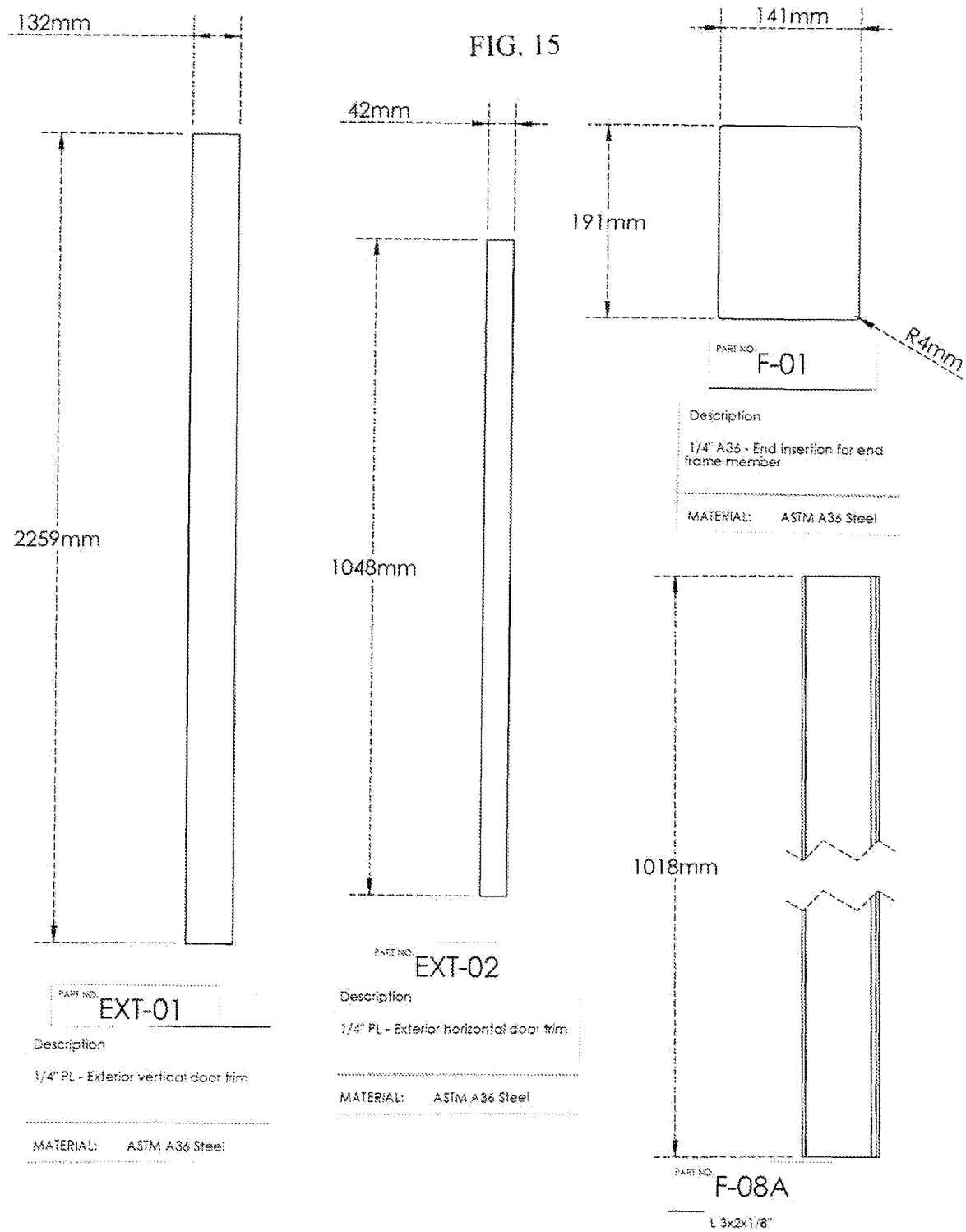
Figure 16:
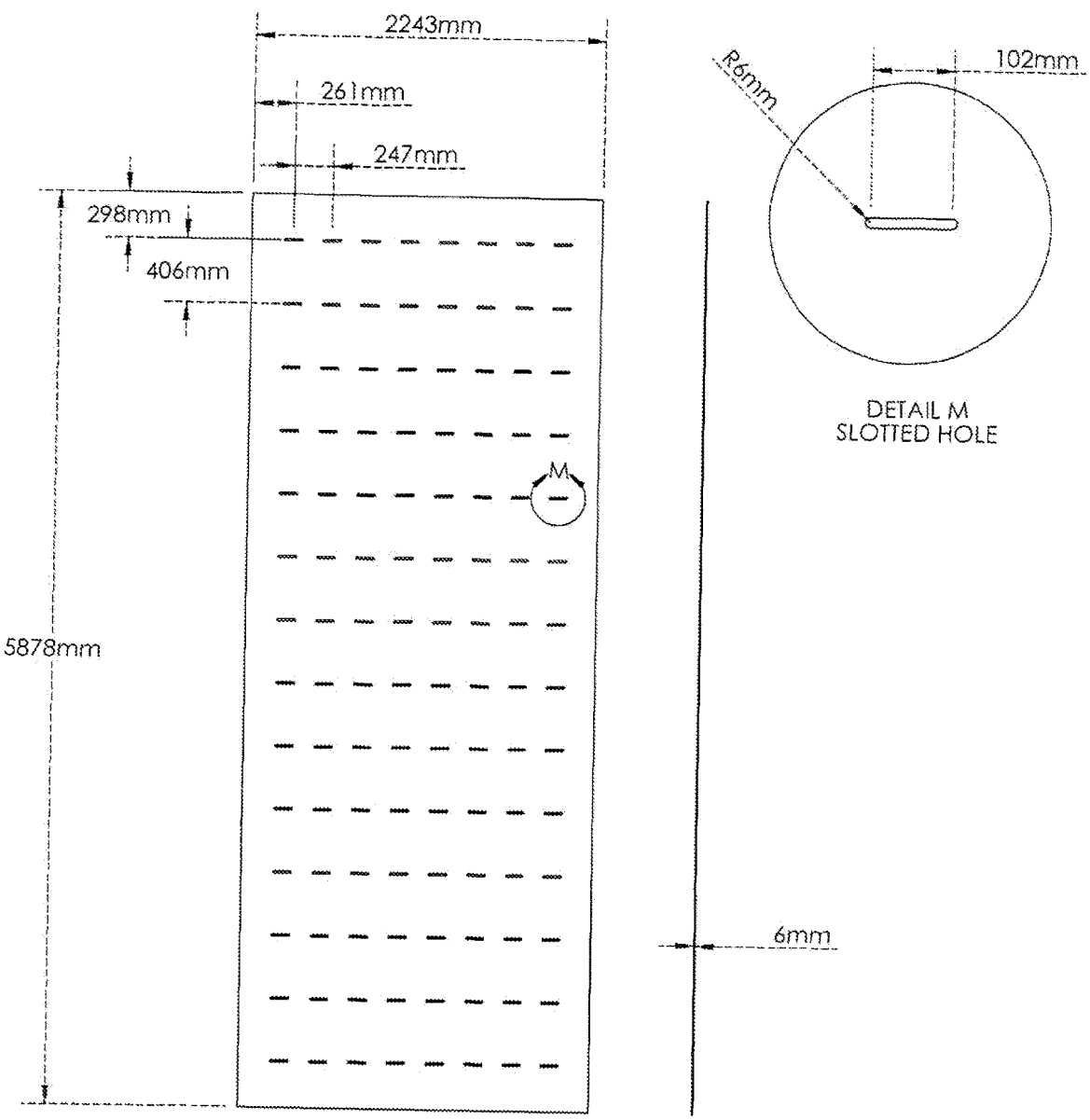
Figure 17:
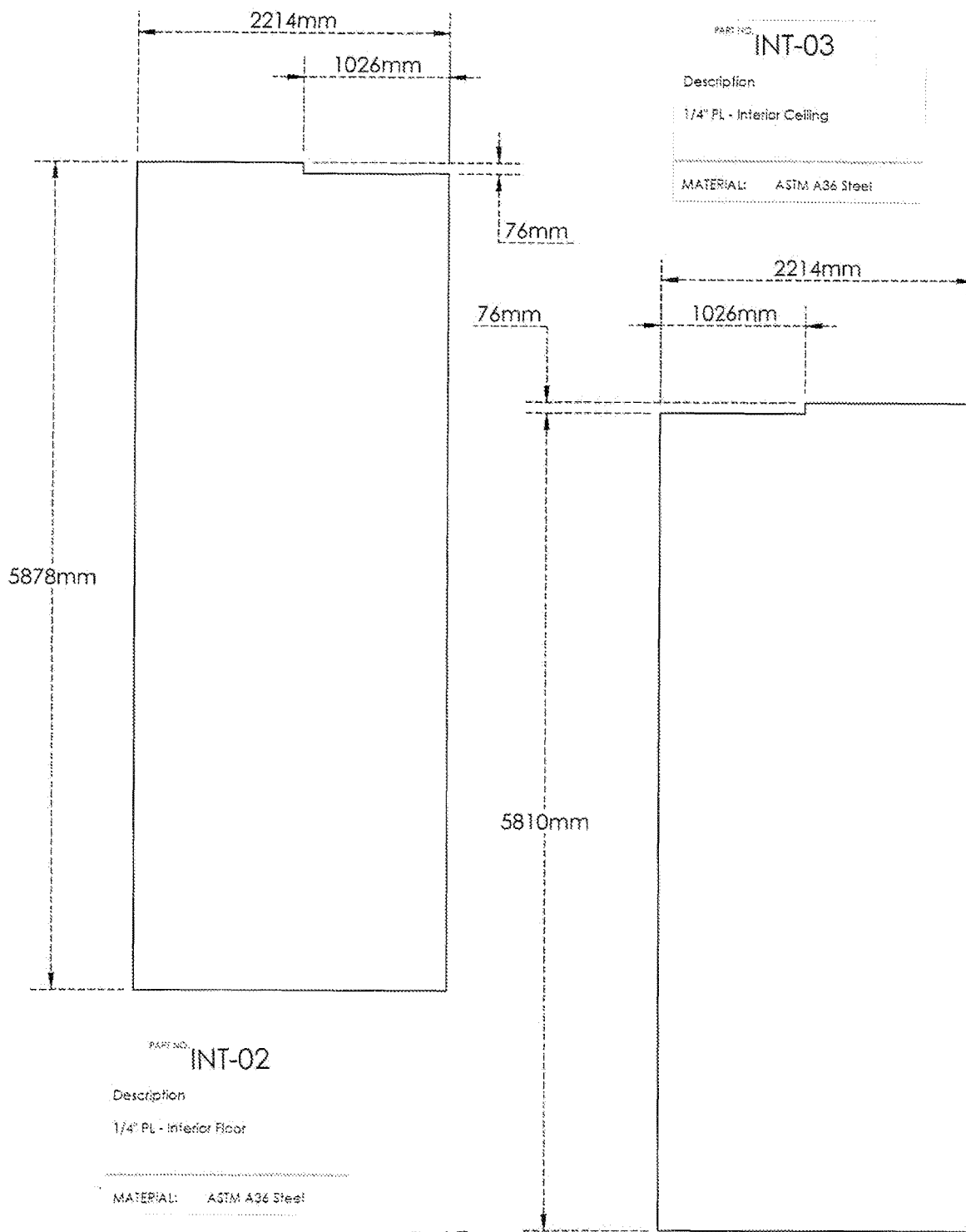
Figure 19:
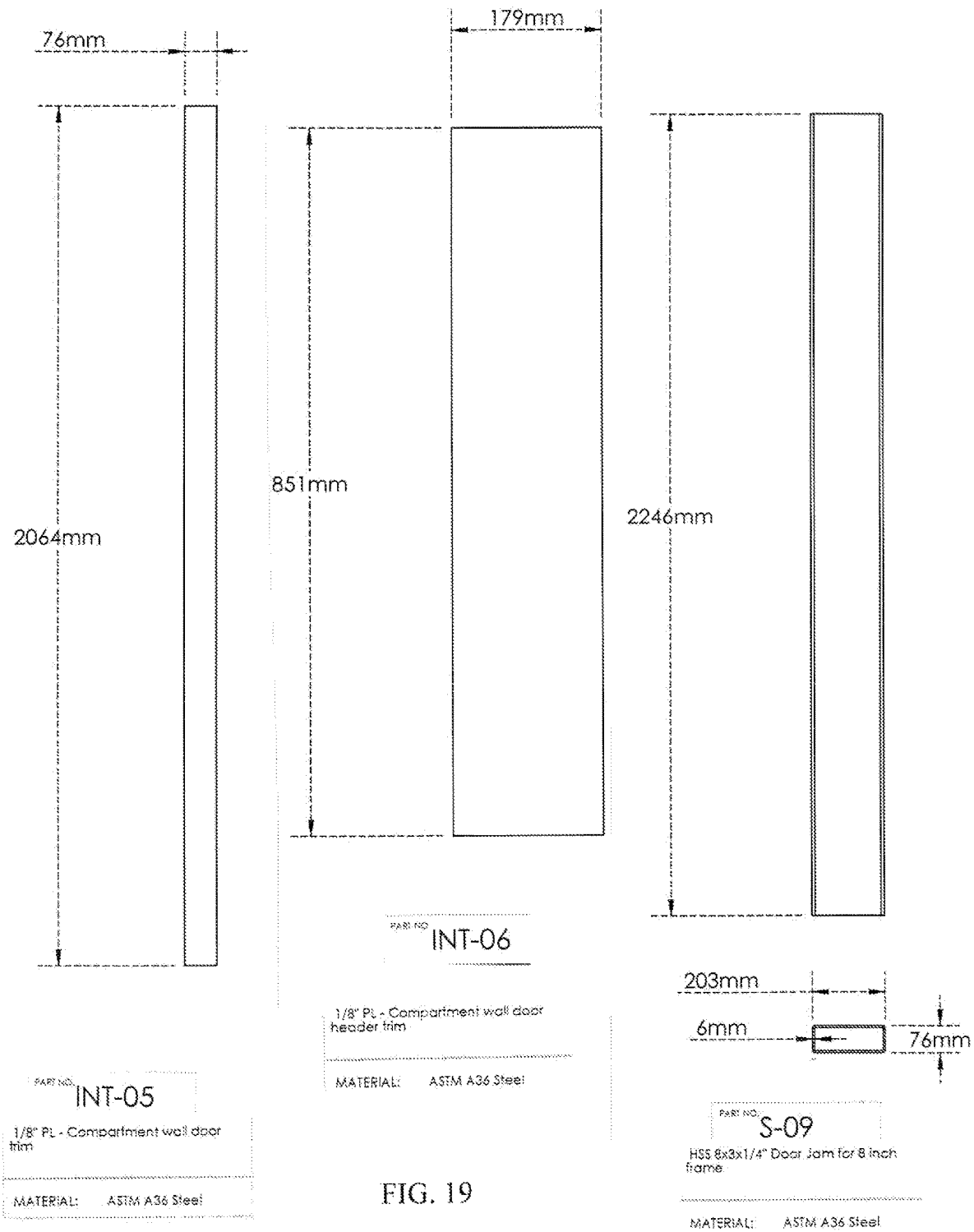
Figure 20:
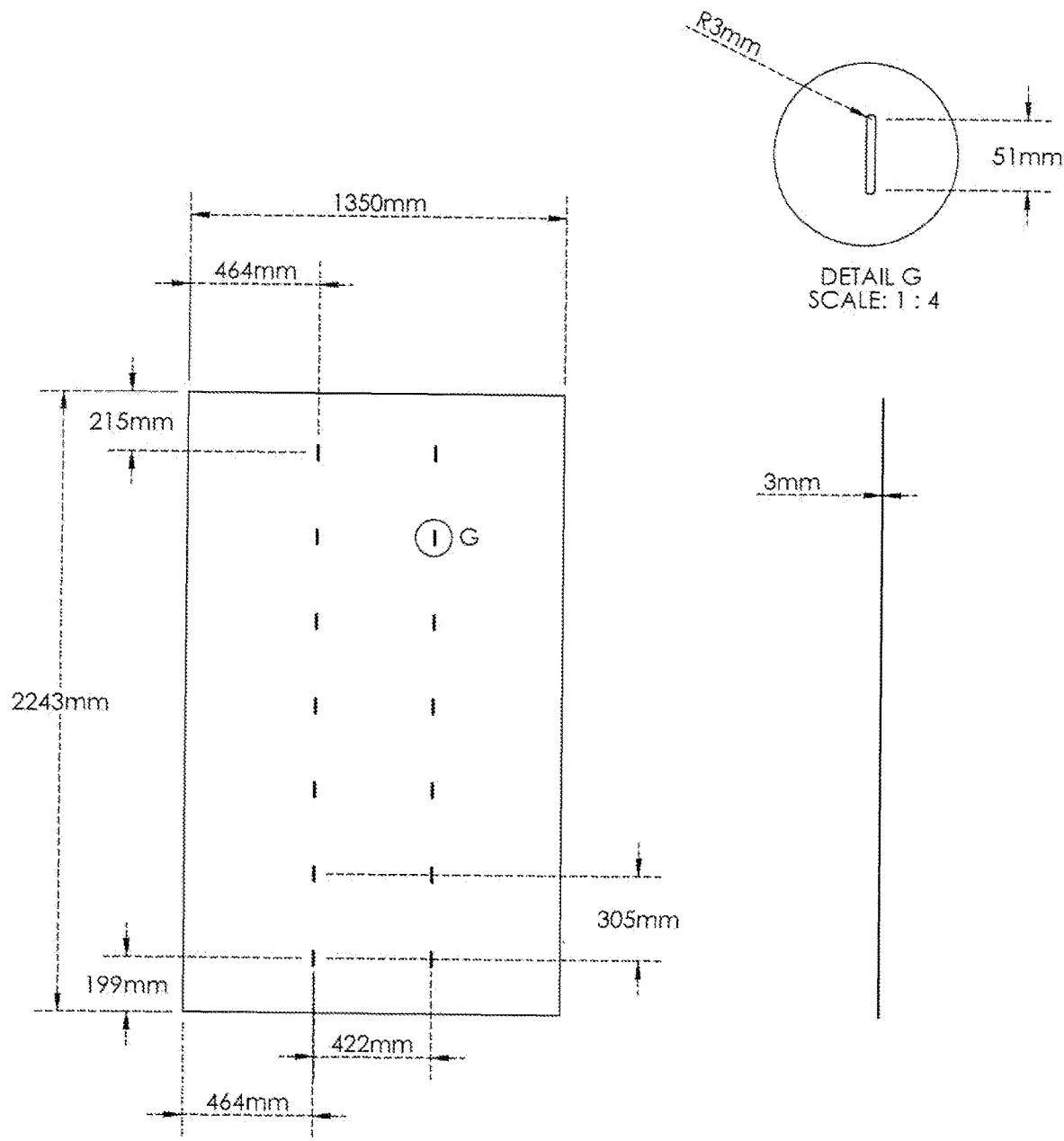
Figure 21:
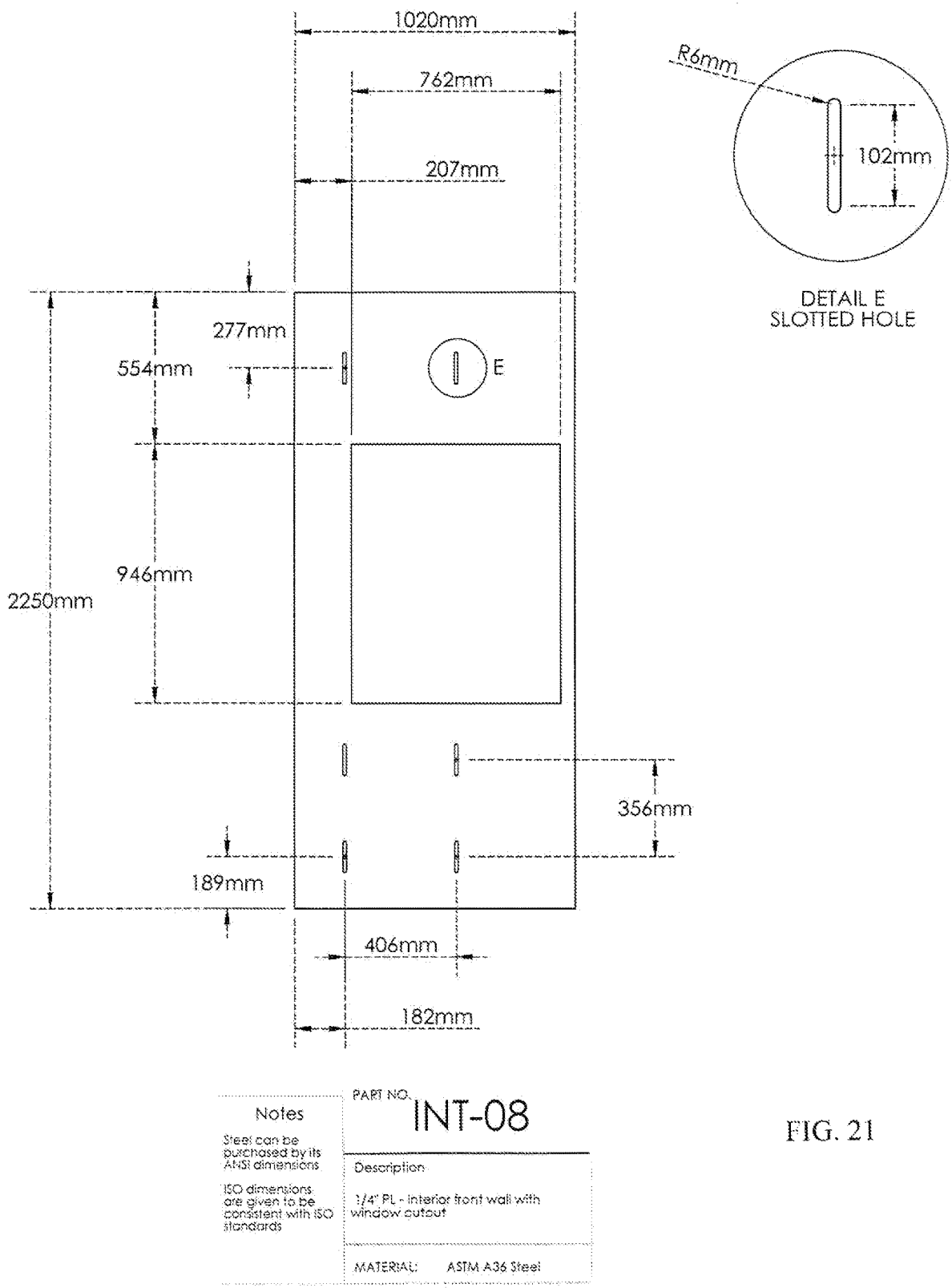
Figure 22:
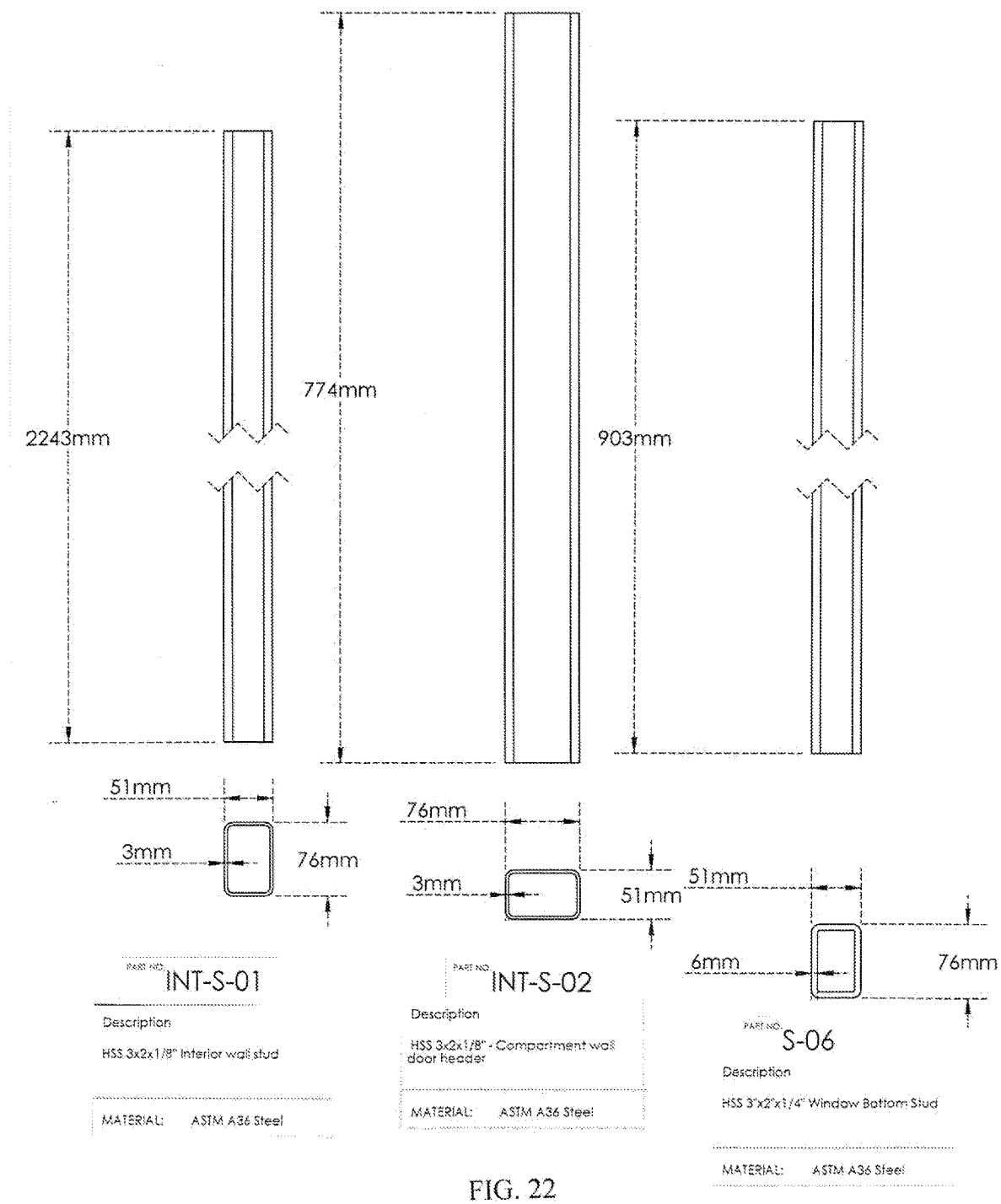
Figure 23:
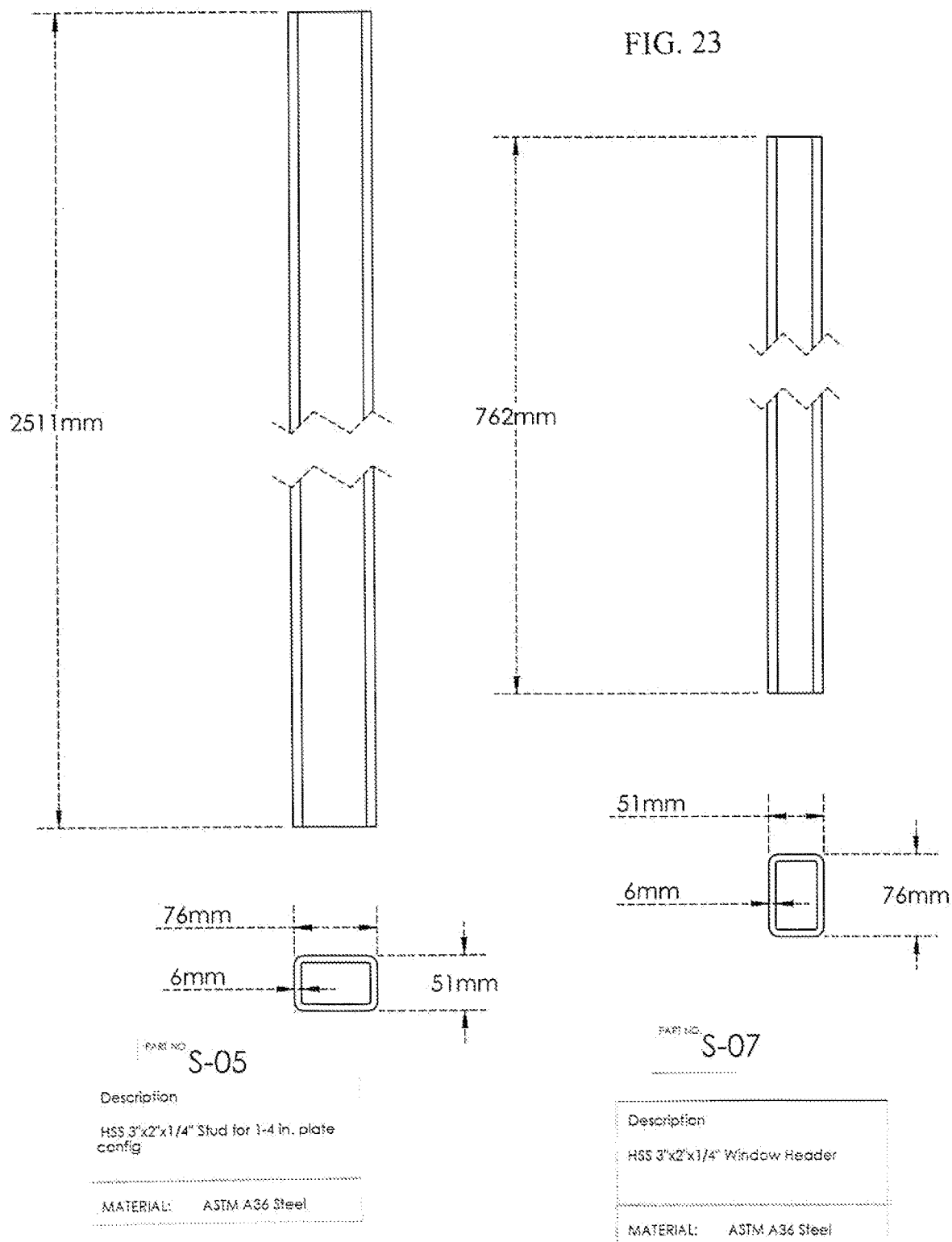
Figure 24:
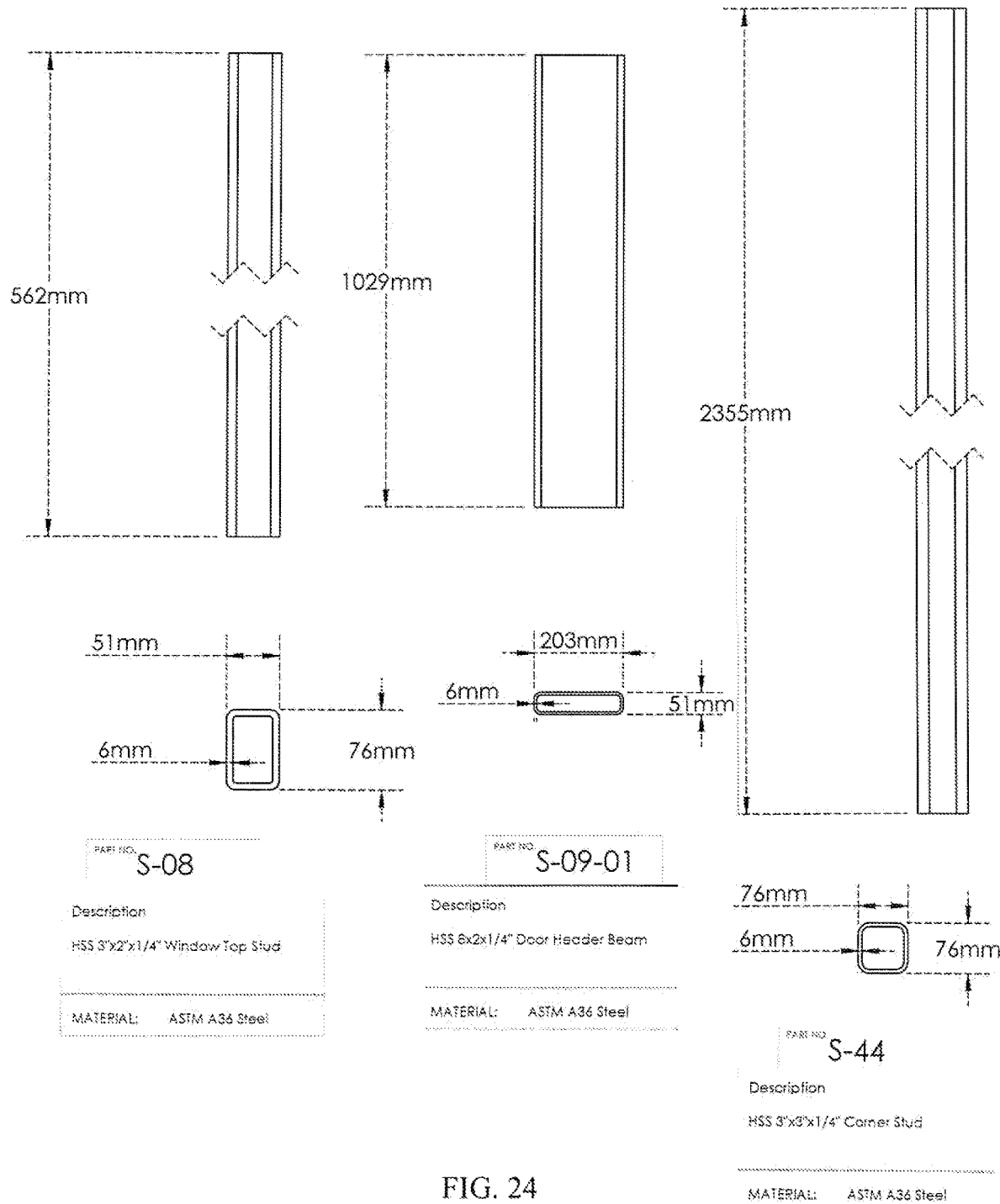
Figure 25:
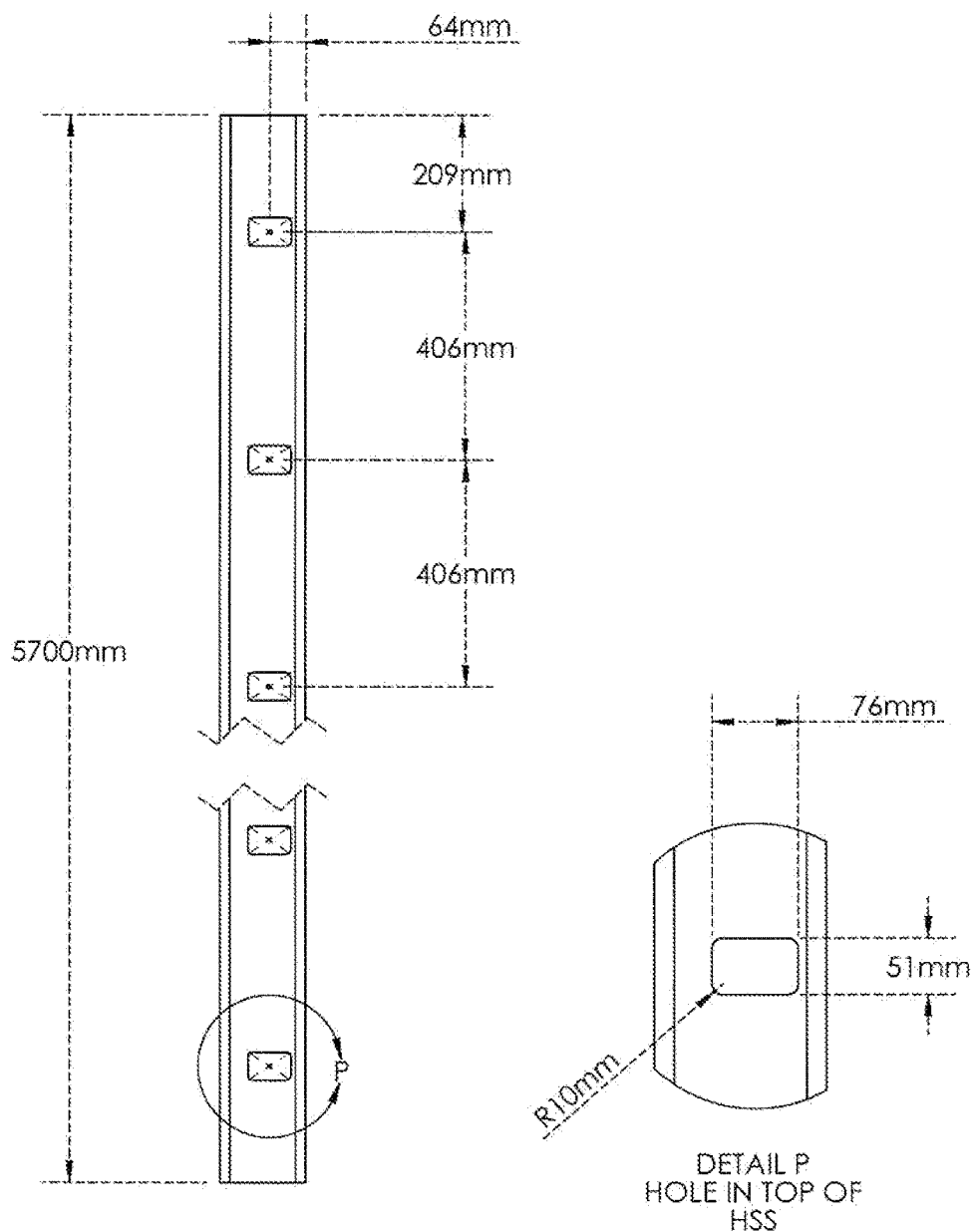
Figure 26:
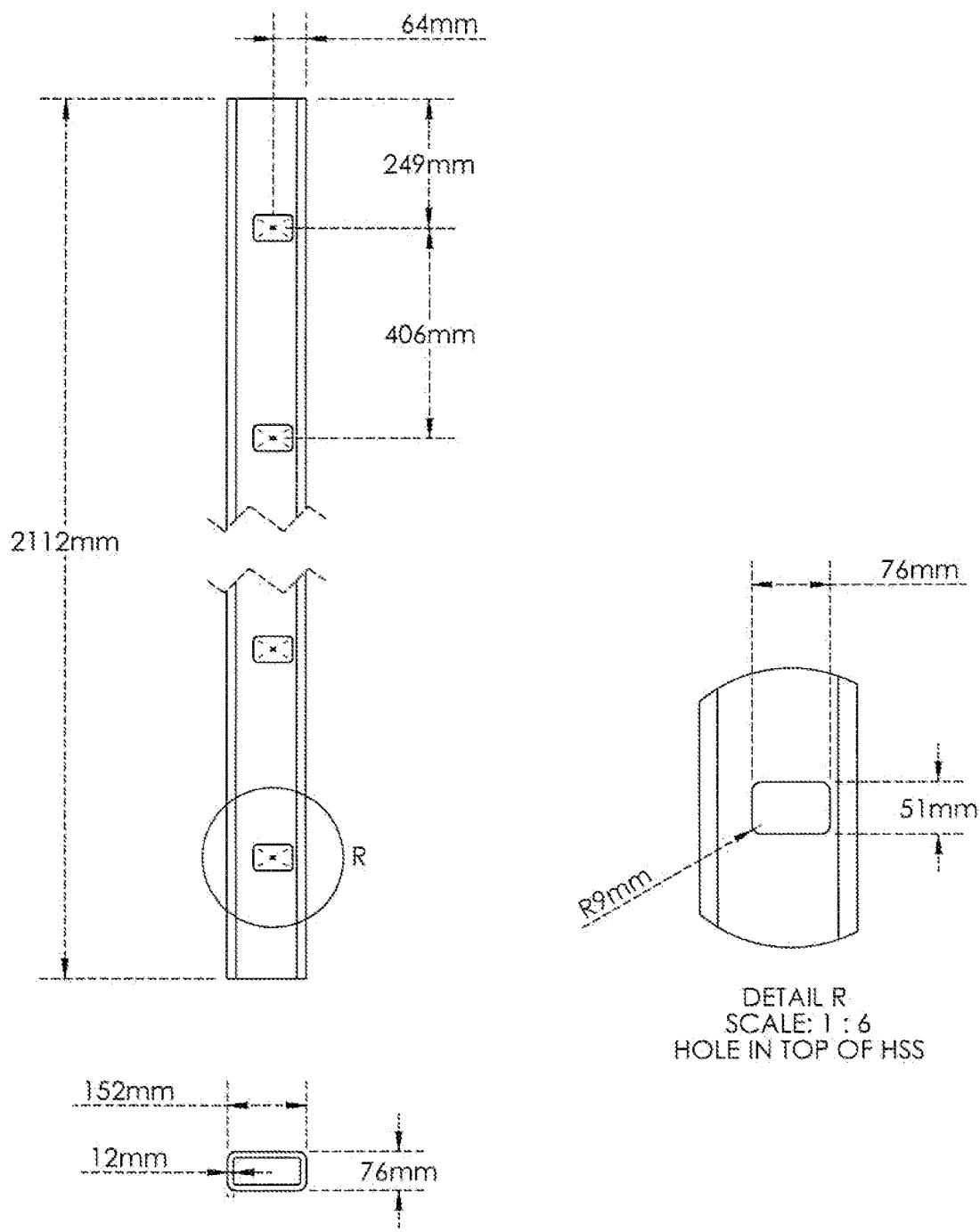
Figure 27:
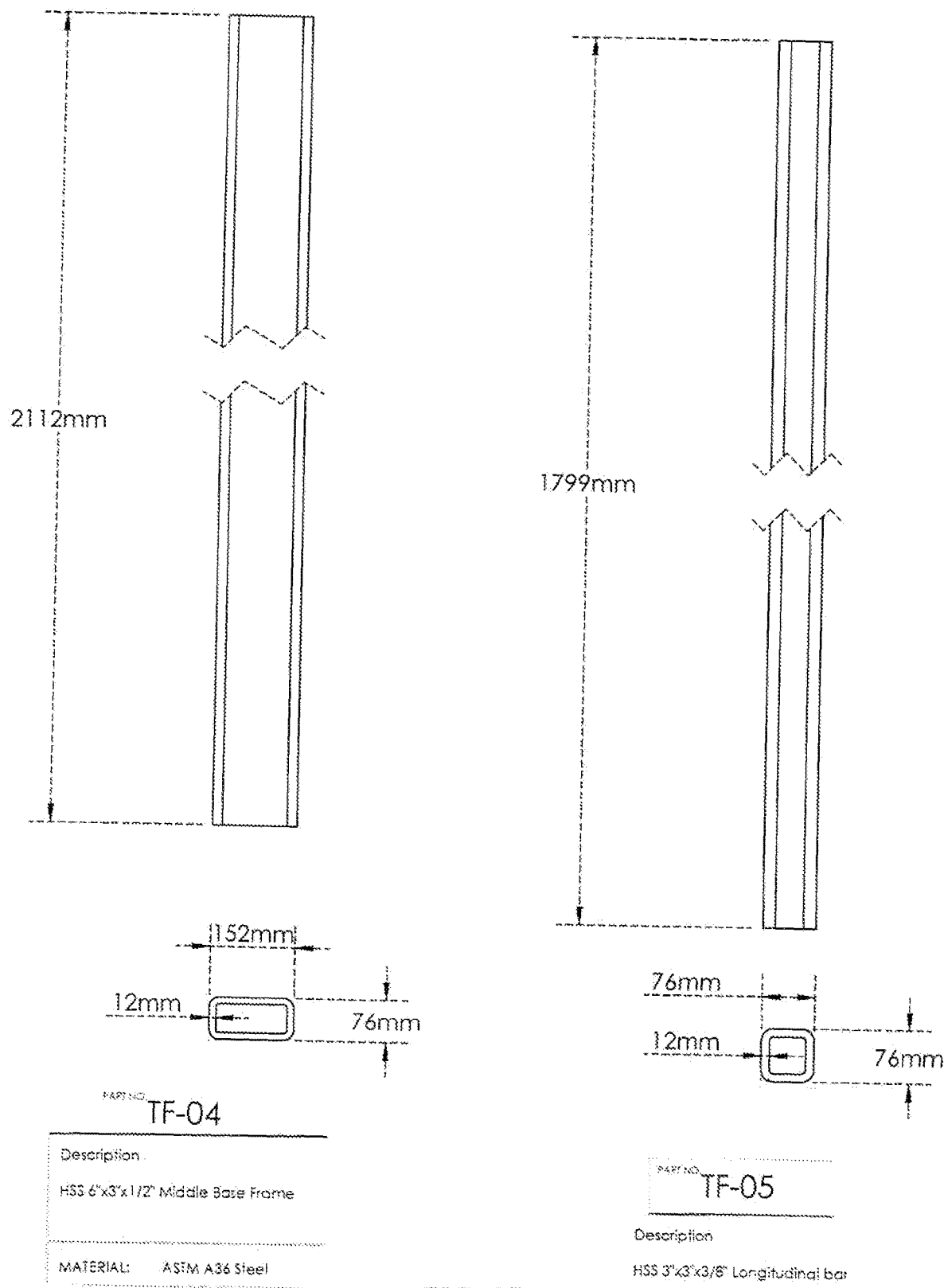
Figure 28:
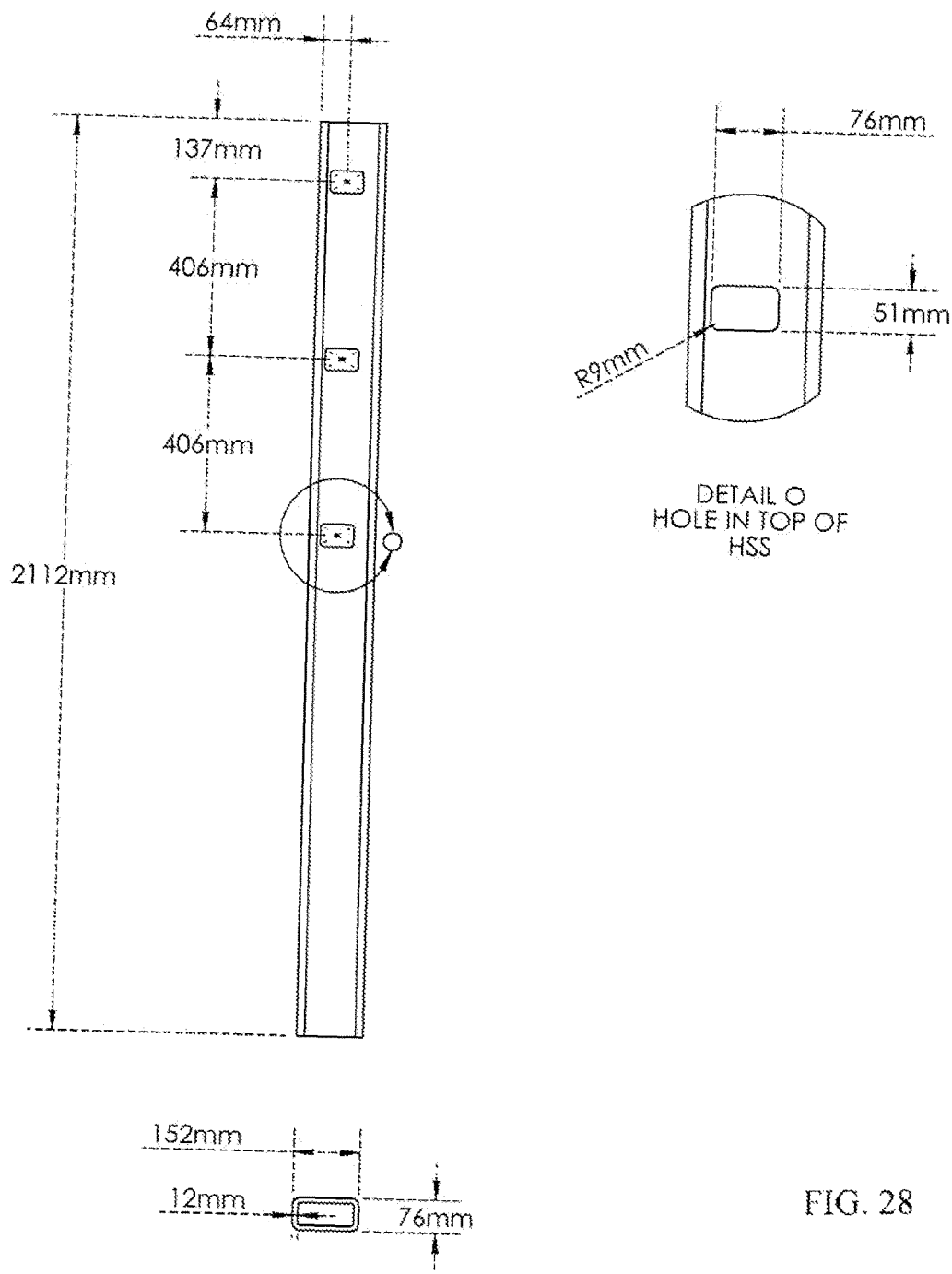
Figure 29:
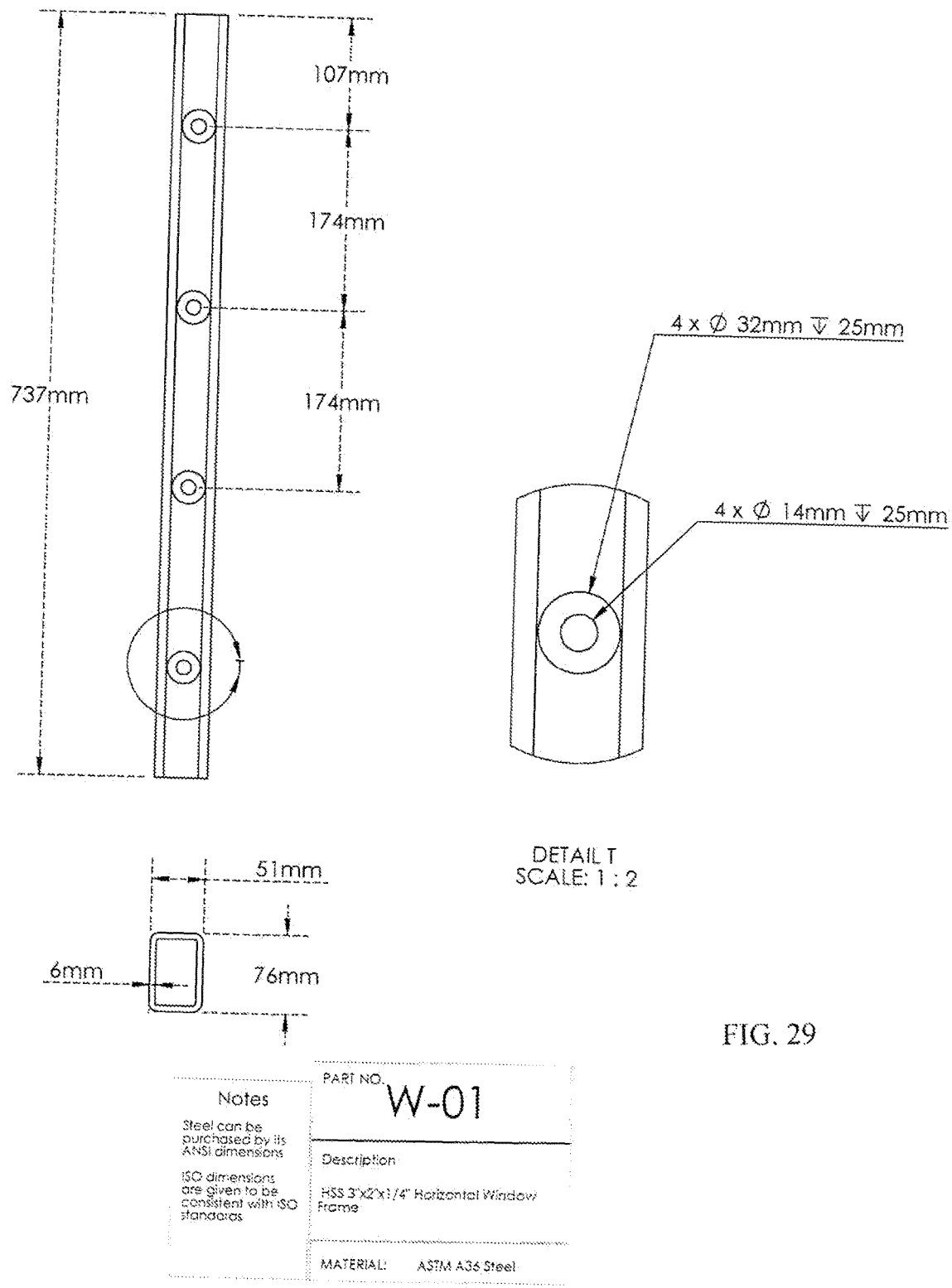
Figure 31:
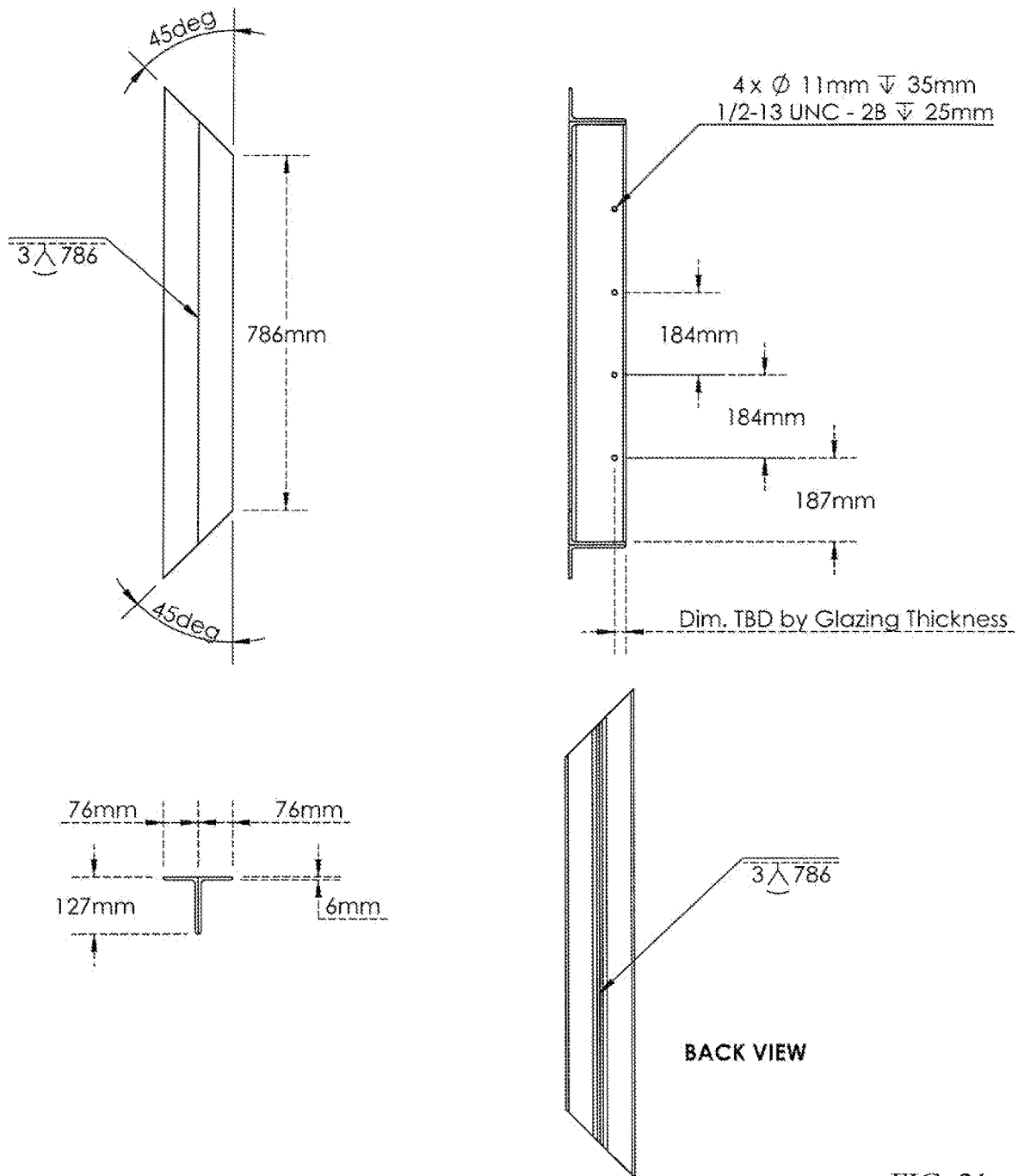
Figure 32:
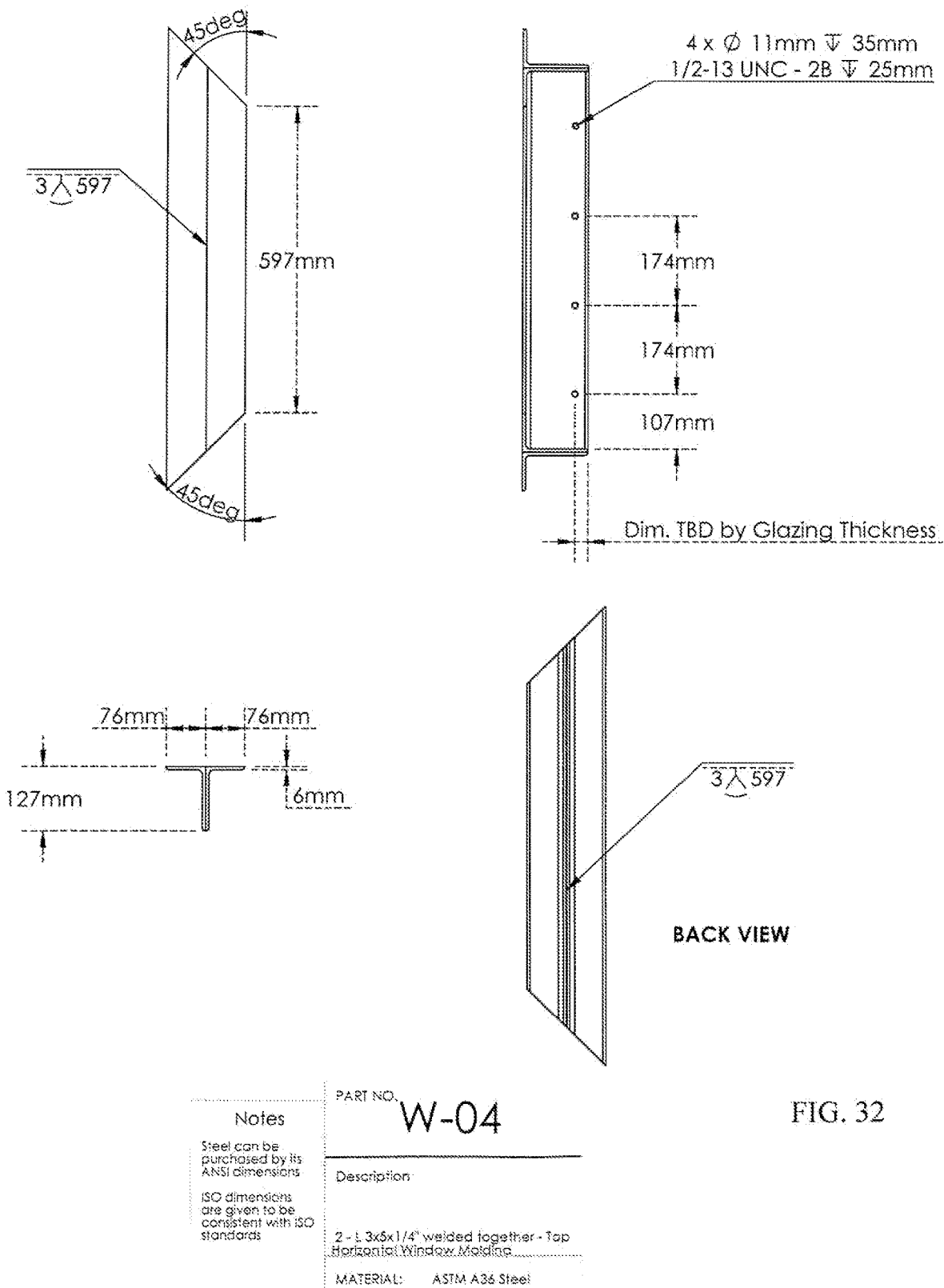
Figure 33:
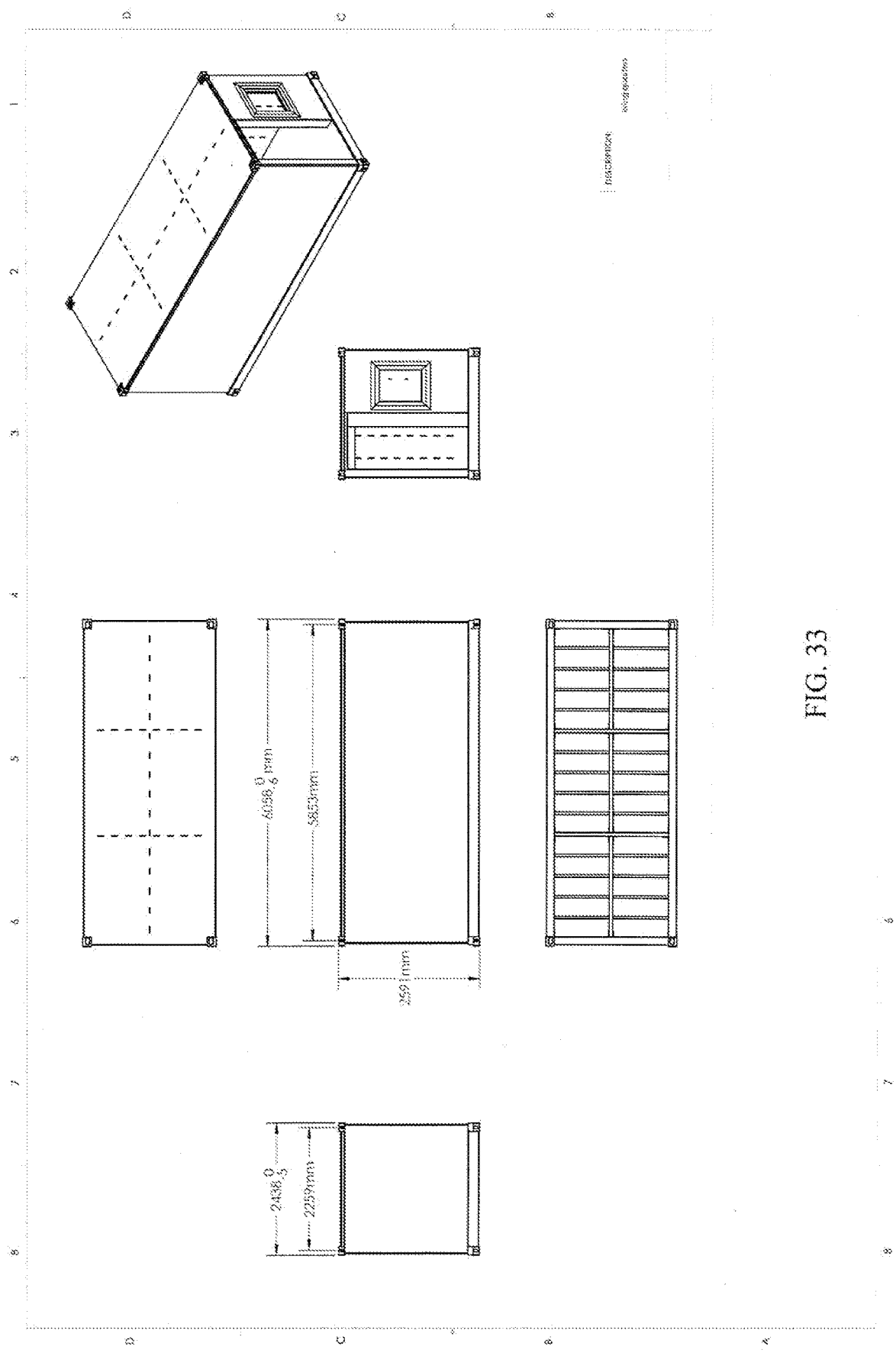
FIG. 33 shows several views of an ISO container in accordance with an embodiment of the invention.

FIG. 4 shows an expanded partial isometric view of an ISO container frame in accordance with the invention wherein a plurality of members 30 are used in both end walls and side walls of the frame structure. Specially fabricated forklift openings 35 are also provided comprising elongated rectangular cross section tube elements 37.

EXAMPLE

Figure 36:
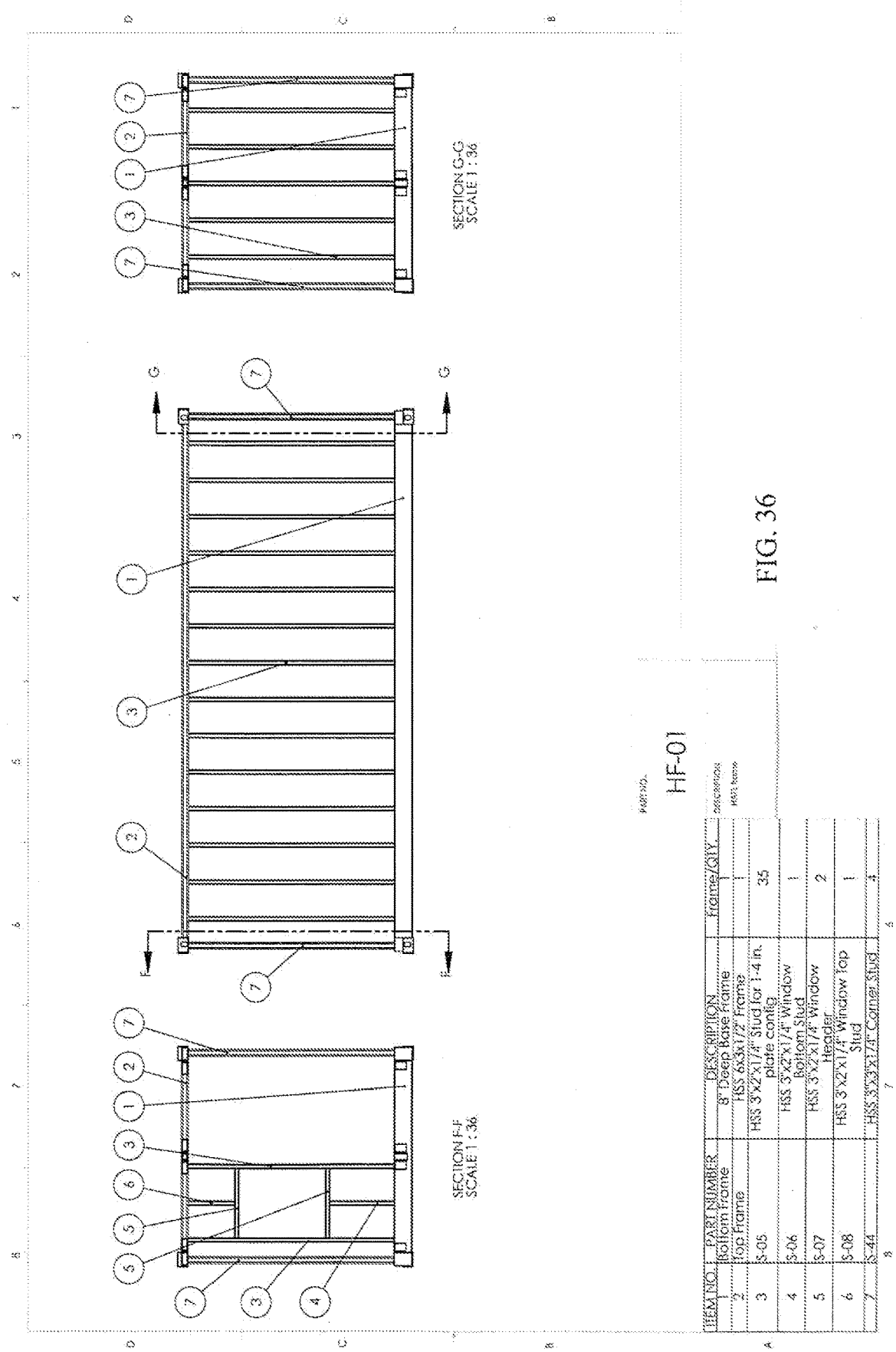
FIG. 36 shows assembly drawings for the side and end walls of an embodiment in accordance with the present invention.

FIG. 5 through FIG. 32 represent a complete set of fabrication drawings for every piece necessary to build a particular embodiment of the present invention. FIG. 34 is an assembly drawing for the bottom base frame having Item Numbers 1-14 and shows a relationship of each of the parts on the incorporated Parts Table. FIG. 35 is an assembly drawing for the top base frame having Item Numbers 1-9 and shows the relationship of each of the parts on the incorporated Parts Table. FIG. 36 shows assembly drawings for the side and end walls of an embodiment in accordance with the present invention. FIG. 36 further shows Item Numbers 1-7 and their relationship in assembling the structure in accordance with the invention.

Figure 37:
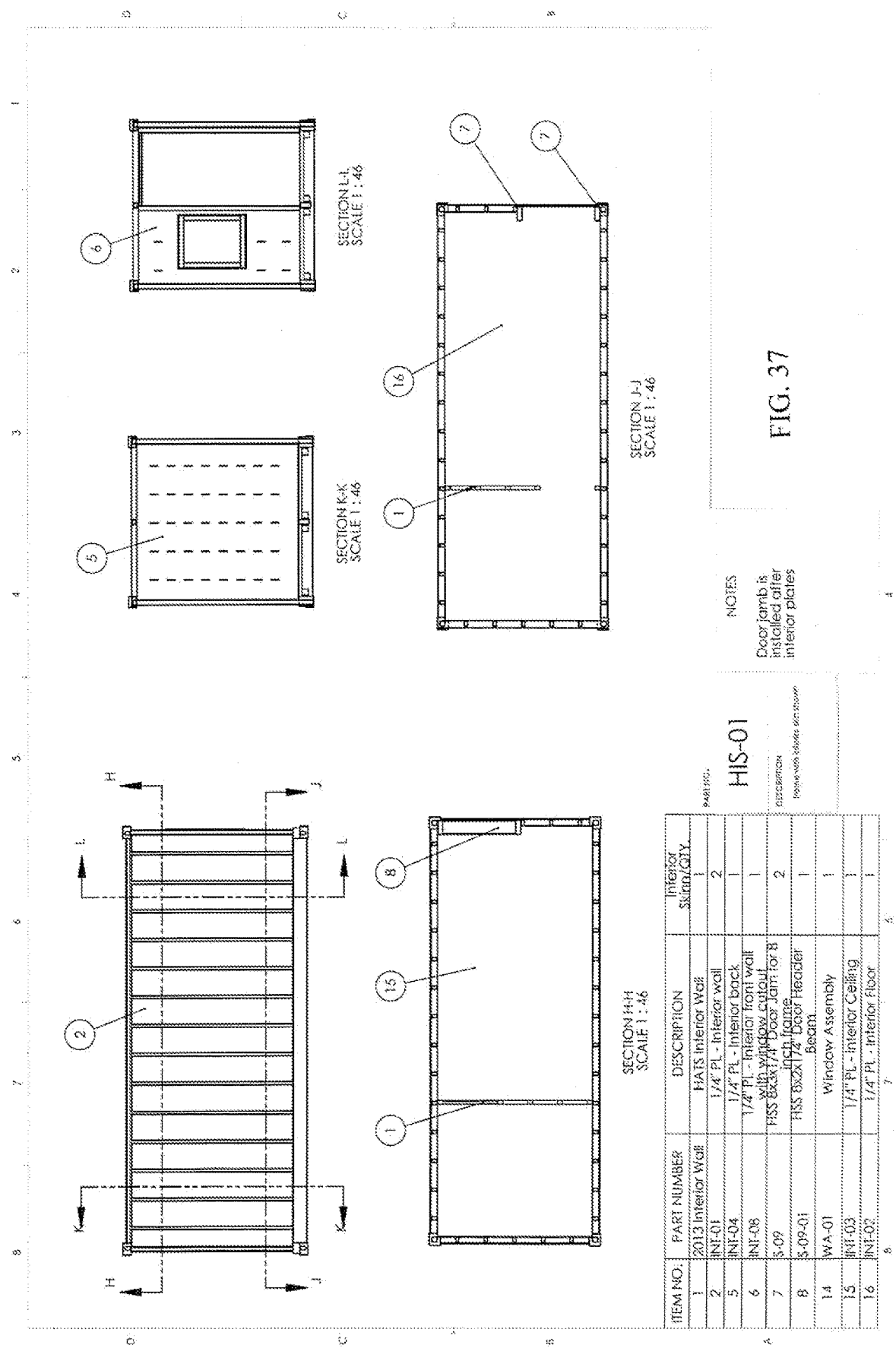
FIG. 37 shows 4 section views and one side view of the frame in accordance with an embodiment of the invention, in particular a feature in accordance with embodiments of the invention wherein the interior walls are formed from single pieces of plate and welded to the structure via a plug welding technique.
Figure 38:
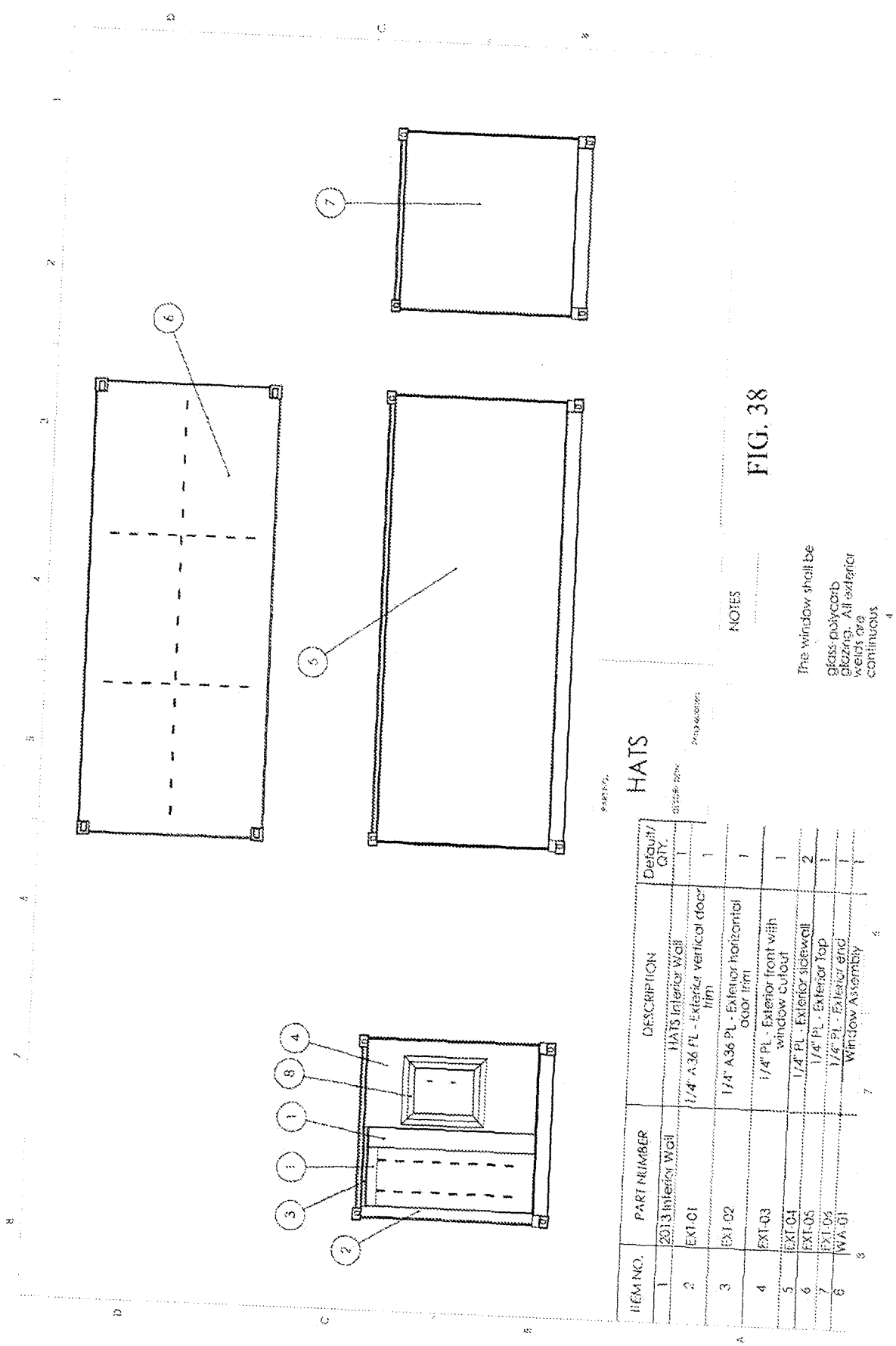
FIG. 38 shows a particular feature of an embodiment of the present invention wherein single piece cladding is also used for the exterior sidewalls, exterior top, and exterior ends of the structure in accordance with invention.
Figure 39:
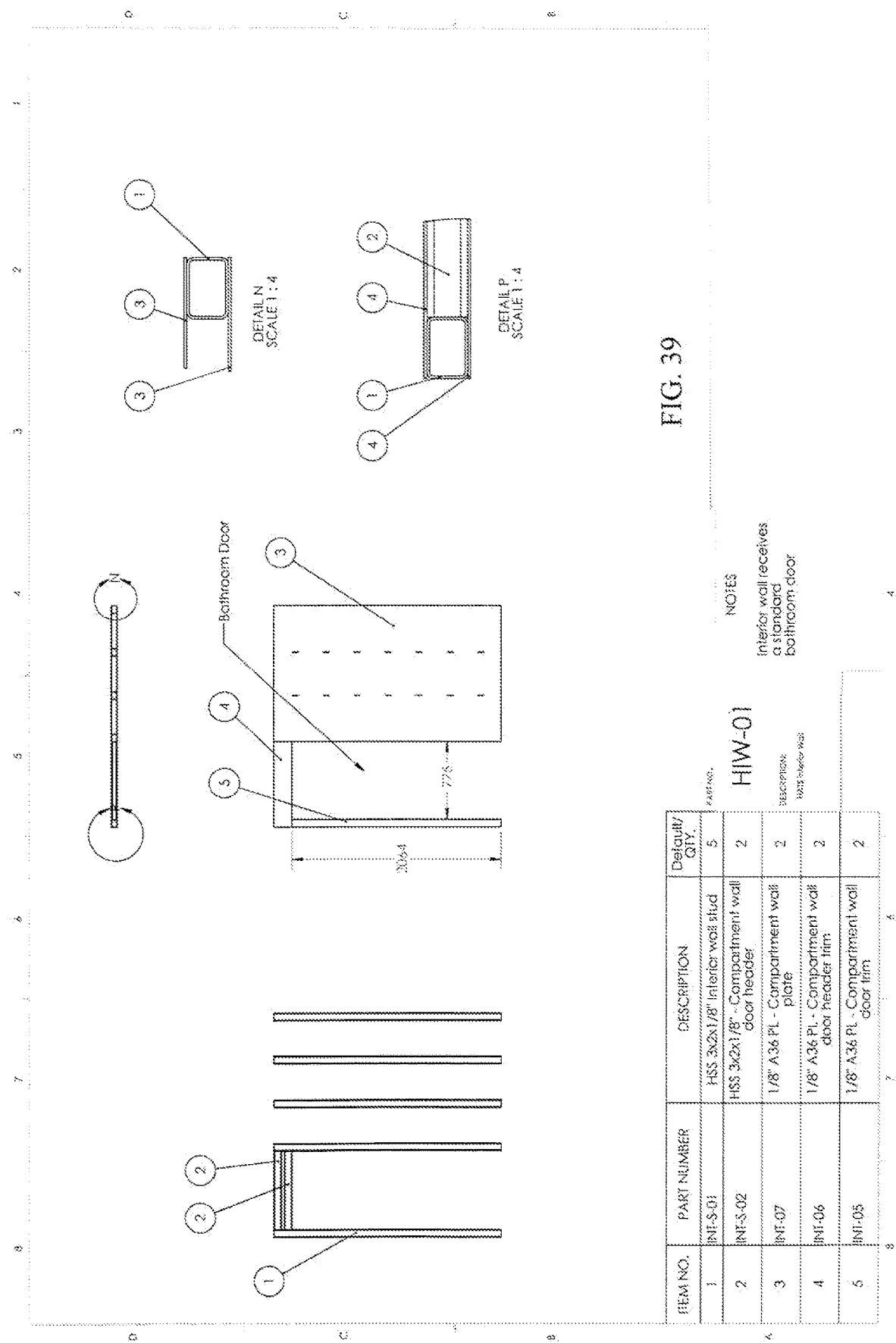
FIG. 39 shows assembly drawings for an interior wall (HIW-01) in accordance with an embodiment of the invention and also shows the relationship of the individual parts indicated as items 1-5 in the parts list.
Figure 40:
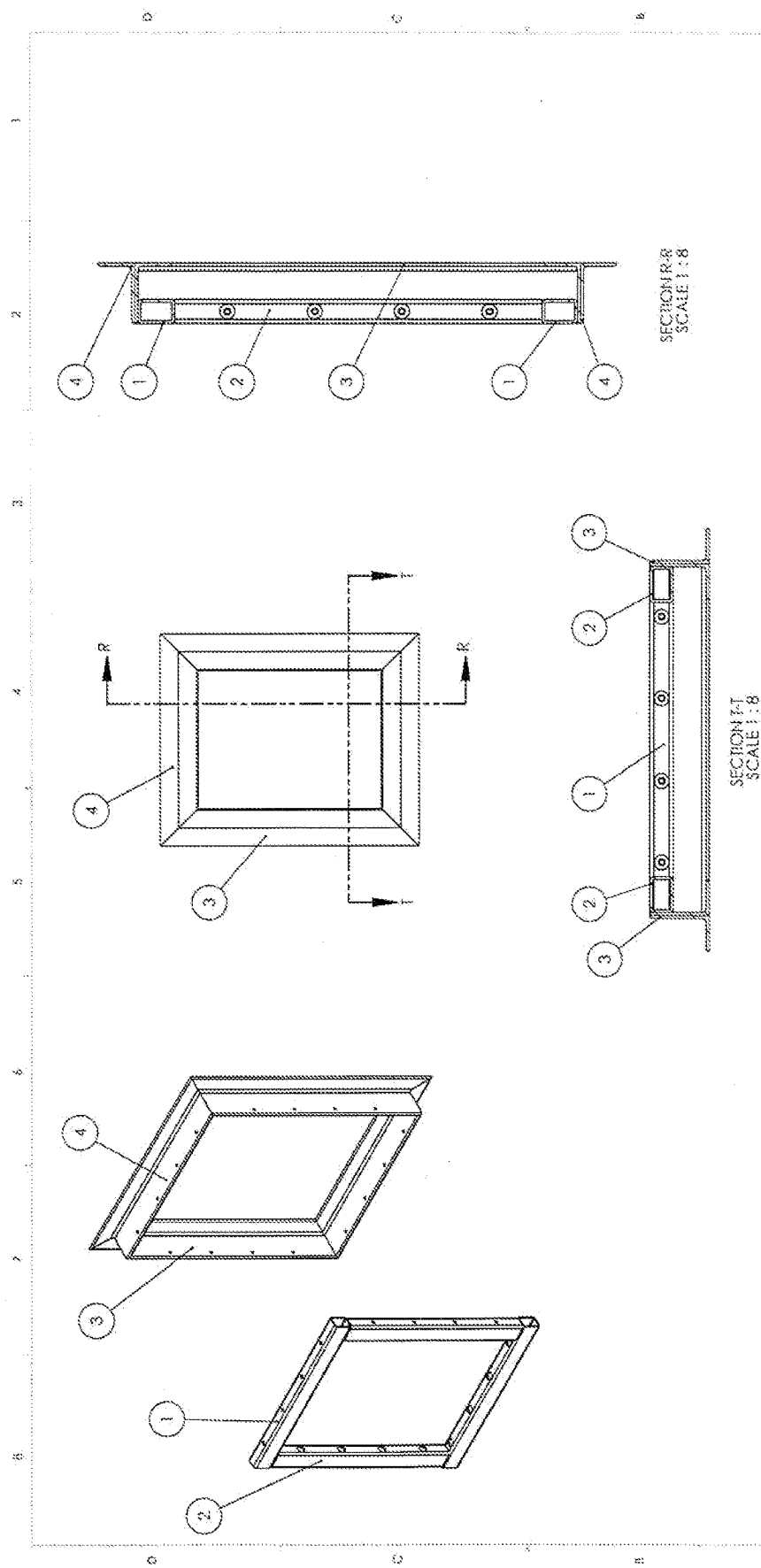
FIG. 40 shows assembly drawings for a window assembly (WA-01) in accordance with an embodiment of the invention and also shows the relationship of the individual parts indicated as items 1-4 in the parts list.
Figure 41:
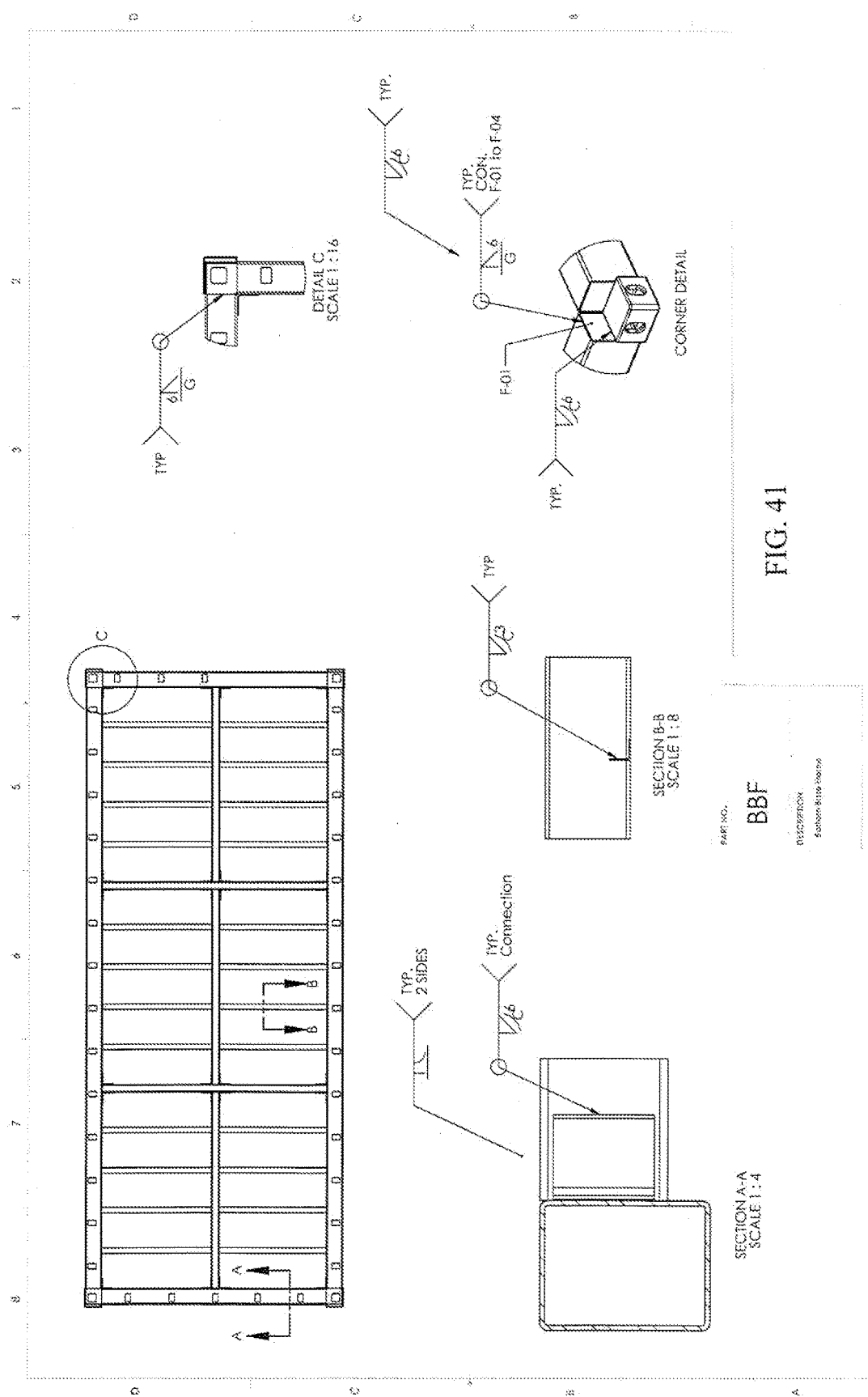
FIG. 41 shows the bottom base frame (BBF) in a plan view, and also includes two section views and an isometric corner detail and plan view corner detail.
Figure 42:
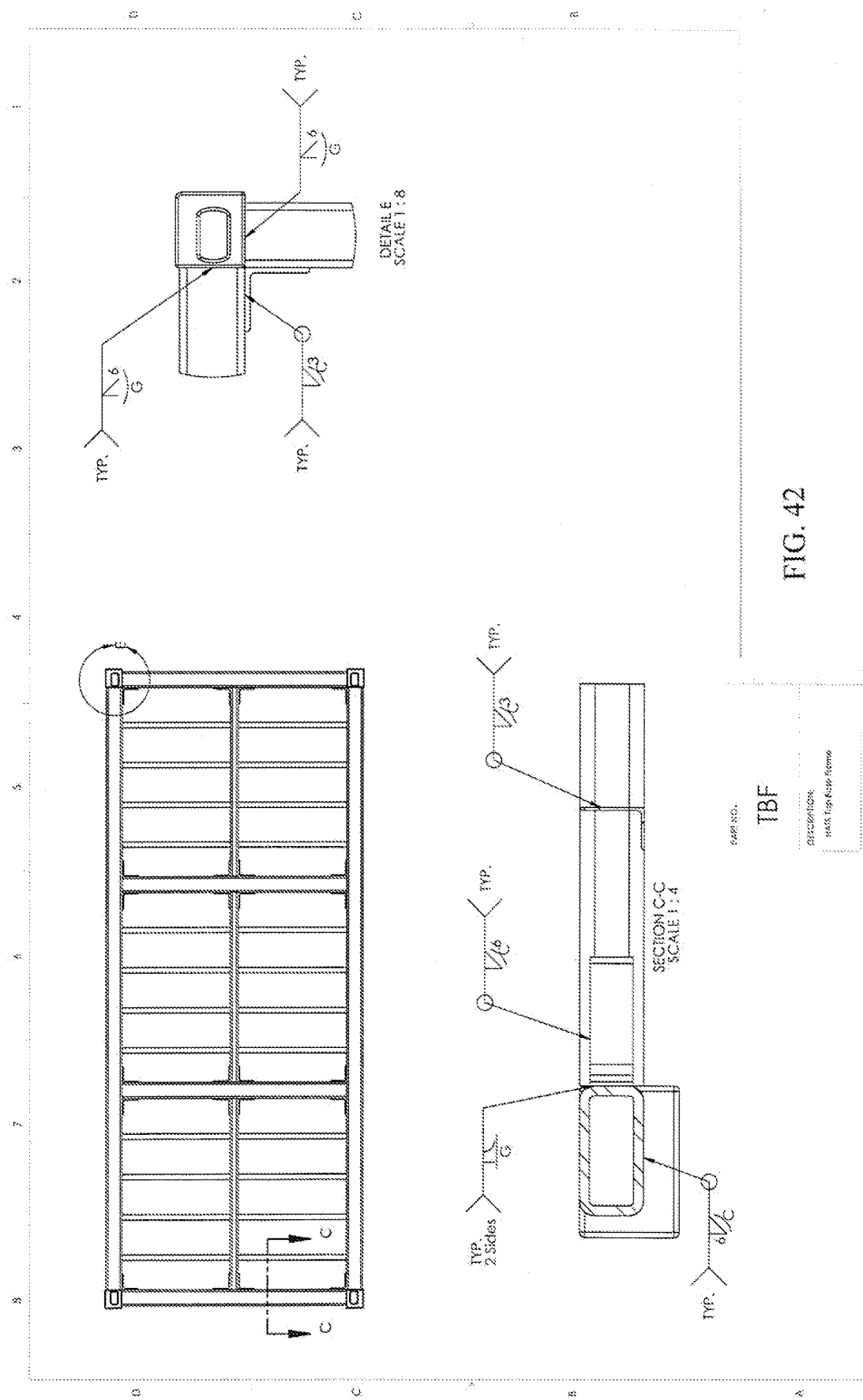
FIG. 42 shows the top base frame (TBF) in a plan view, and also includes a section view and a plan view corner detail.
Figure 43:
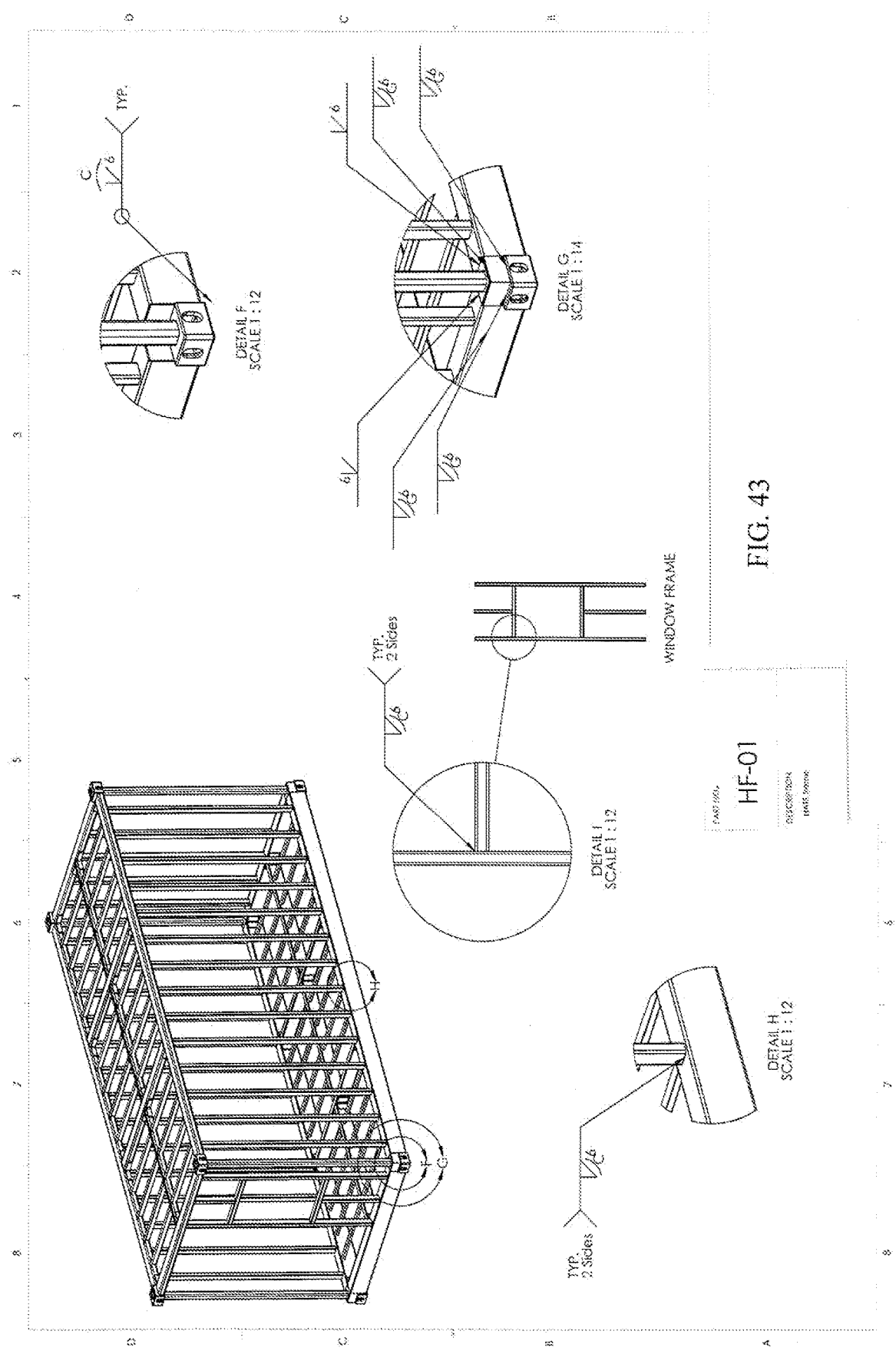
FIG. 43 shows an isometric view of the ISO frame in accordance with an embodiment of the invention and includes two corner isometric details, a side isometric detail and two window frame opening details.
Figure 44:
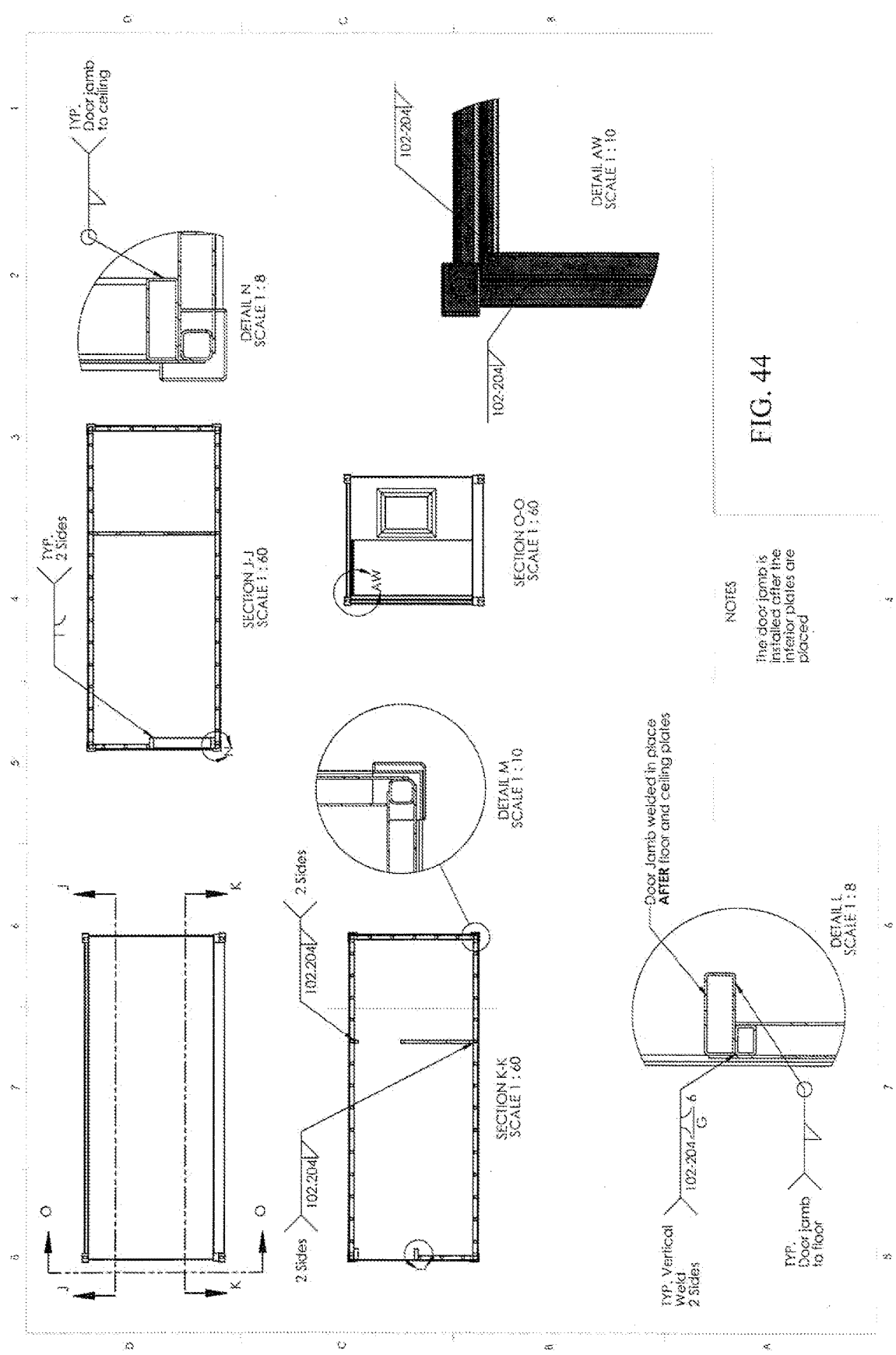
FIG. 44 shows assembly details and weld details for embodiments of the invention.
Figure 45:
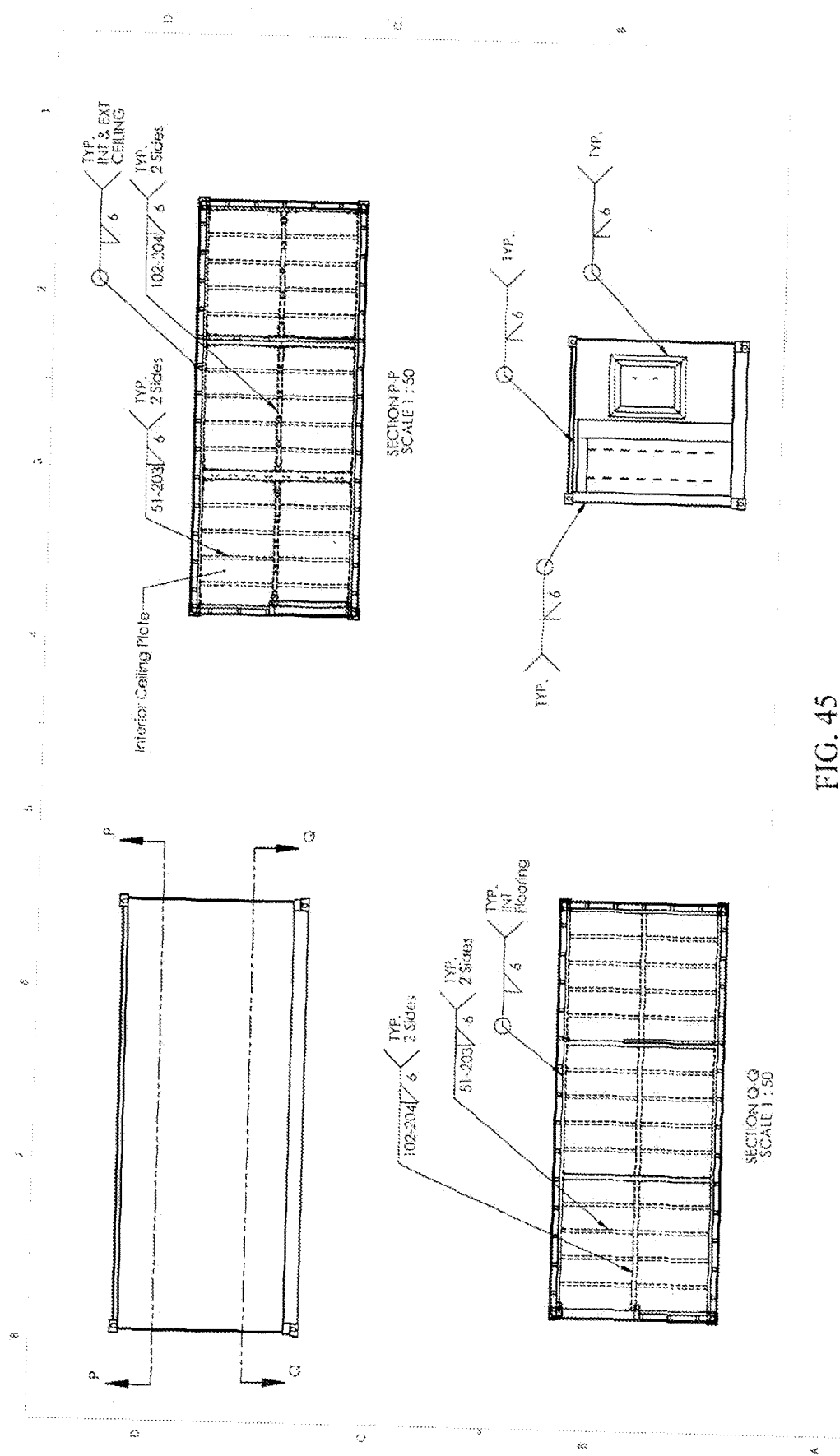
FIG. 45 shows floor, ceiling and end wall welding details for the ISO frame in accordance with embodiments of the invention.
Figure 46:
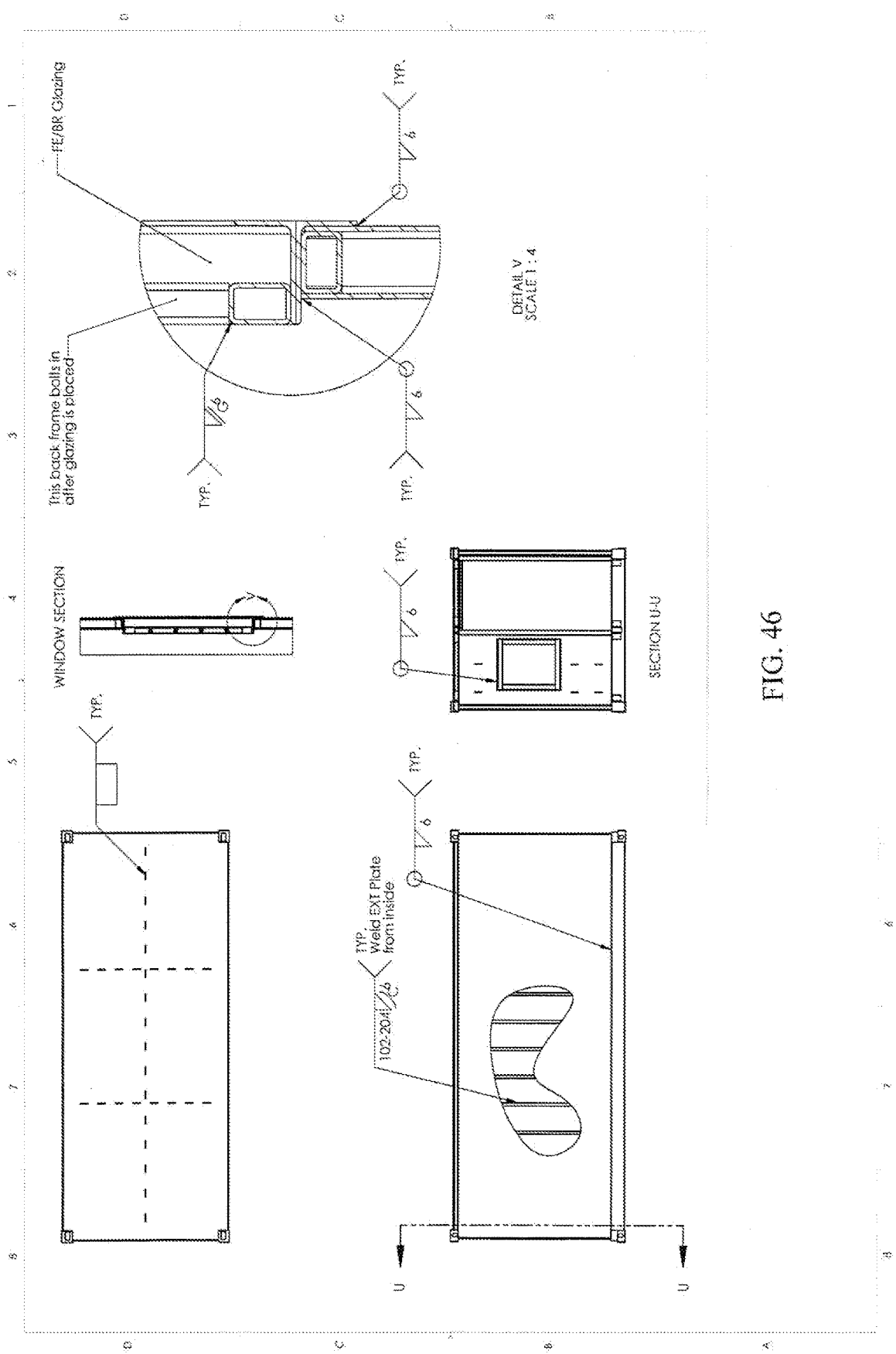
FIG. 46 shows additional welding details for the ISO frame in accordance with embodiments of the invention.
Figure 47:
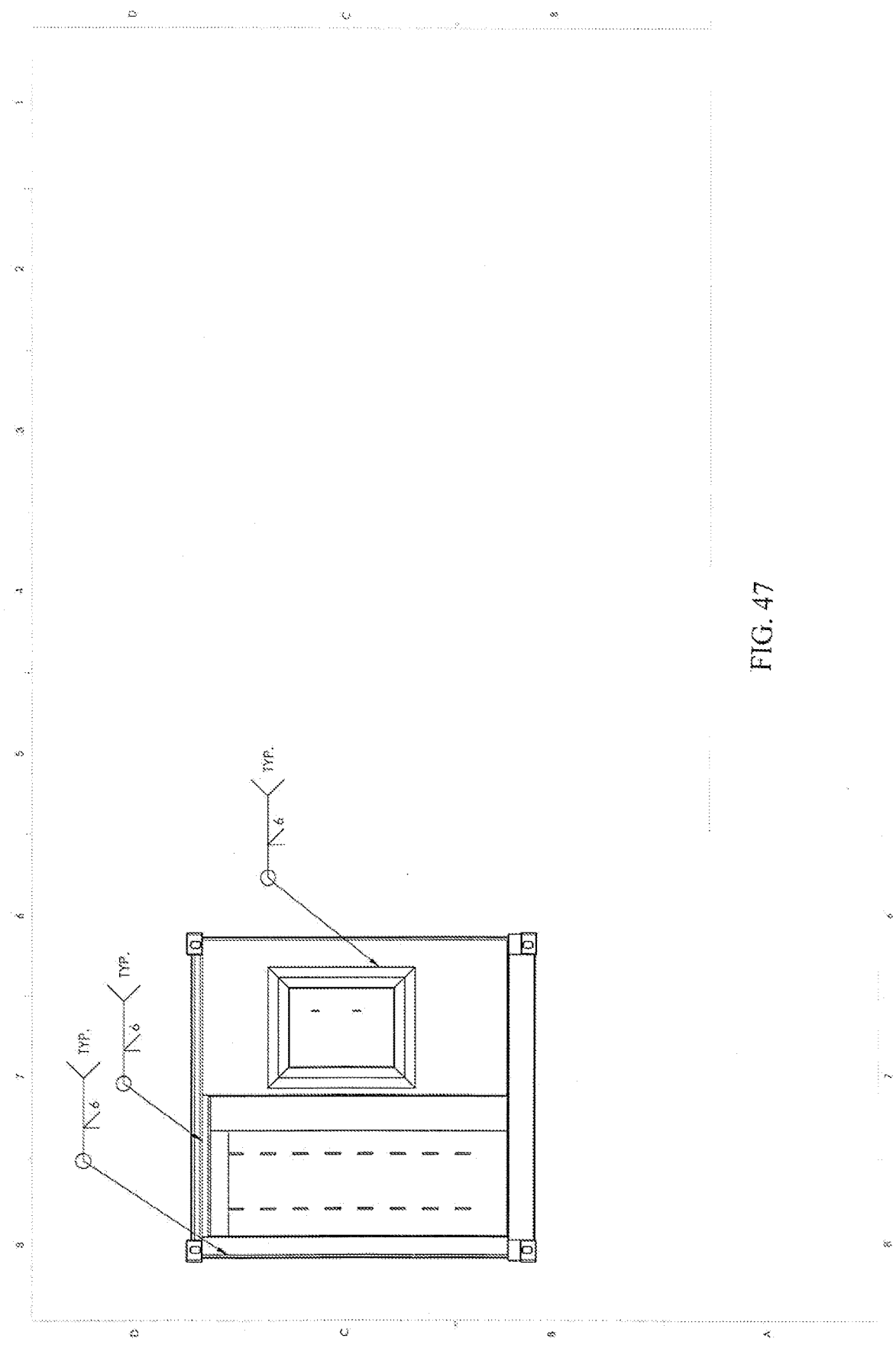
FIG. 47 shows additional welding details for a window containing end wall of the ISO frame in accordance with embodiments of the invention.

FIG. 37 shows a particular inventive feature in accordance with embodiments of the invention wherein the interior walls are formed from single pieces of plate and welded to the structure via a plug welding technique. Further descriptive of this method and structure in accordance with the invention, FIG. 38 shows a particular feature of an embodiment of the present invention wherein single piece cladding is also used for the exterior sidewalls, exterior top, and exterior ends of the structure in accordance with invention. In embodiments of the invention this expedient to construction is utilized depending upon the availability of large size metal plate material.

As discussed above, the double layer cladding or skin of the interior and exterior walls, floors and top of the structure in accordance with the invention may be fabricated from from single, full-size pieces. The exterior full size pieces are fabricated and placed in position and welded to the structure from the inside of the structure. Following this, all the interior pieces for the sidewalls, ends, floor and top of the structure have specially pre-manufactured openings aligned with the underlying structure into which a plug weld is placed to attach all the interior walls, ends, floor and roof material.

This ingenious method in accordance with the invention lowers cost and labor because fewer pieces have to be fabricated, and less welding must be performed to complete the fabrication, when compared to laying up the interior and exterior cladding from smaller pieces. This is especially true when considering the amount of pieces which would be necessary for fabricating and installing the interior walls if the pieces spanned only one or two of the individual vertical strengthening member members 30.

Reference is made to FIGS. 8, 16, 18, 20, 21, 33, 37, 38, 39, 45, 46 and 47 which show the arrangement of the slotted holes which are used plug weld the interior wall sections of the structural unit in accordance with the present invention. In particular, reference is made to FIG. 8 which depicts a detail of the slotted hole provided for plug welding in accordance with certain embodiments of the present invention.

FIGS. 41-47 further provide weld details in accordance with certain embodiments of the present invention.

As used herein, "low quality structural weld" means a weld that would fail customary non-destructive QA and inspection techniques used by ISO, ASME and/or AWS in the development of their weld quality standards for structural steel welding, for example, radiography or dye testing.

In embodiments of the invention, the HATS structure in accordance with the invention may have 5% to 10% low quality structural welds, 10% to 20% low quality structural welds, 20% to 30% low quality structural welds, 30% to 40% low quality structural welds, 40% to 50% low quality structural welds, 50% to 75% low quality structural welds, or greater than 75% low quality structural welds.

The claims appended hereto are not intended to be limiting of the invention.

What is claimed is:

1. A hardened trailer structure having blast, ballistic and forced entry resistance properties, the structure having a frame assembly comprising:
    four corner posts, two lower side members, two upper side members, two lower cross members, two upper cross members, and a plurality of vertical strengthening members, the frame assembly forming a rectangular cuboid structure, wherein the lower side member and the upper side member are tubular and comprise openings each configured to receive an extended length of a corresponding one of the vertical strengthening members into an interior cavity of the lower side member and an interior cavity of the upper side member, wherein the extended length at a top end of the vertical strengthening member is received in the opening and interior cavity of the upper side member and is engaged to the upper side member by a welded connection, and the extended length at a corresponding bottom end of the vertical strengthening member is received in the opening and interior cavity of the lower side member and is engaged to the lower side member by a welded connection, the vertical strengthening members spanning between the upper and lower side members to form two reinforced side walls, and wherein the structure further comprises a plurality of wall panels to be welded to the frame assembly as an underlying frame structure, the wall panels comprising interior wall panels including a plurality of pre-manufactured plug weld openings specially arranged to be aligned with the underlying frame structure into which plug welding is placed to attach the interior wall panels to the underlying frame structure.

2. The structure according to claim 1, comprising at least ten vertical strengthening members in each reinforced side wall of the two reinforced side walls and wherein each of said vertical strengthening members is engaged by the welded connection to said upper side member and the welded connection to said lower side member.

3. The structure according to claim 1, wherein the upper cross members and the lower cross members are tubular and comprise openings each configured to receive the extended length of the corresponding one of the vertical strengthening members into an interior cavity of the lower side member and an interior cavity of the upper cross member, the extended length at a top end of the vertical strengthening member is received in the opening and interior cavity of the upper cross member and is engaged to the upper cross member by a welded connection, and the extended length at a corresponding bottom end of the vertical strengthening member is received in the opening and interior cavity of the lower cross member and is engaged to the lower side member by a welded connection, the vertical strengthening members spanning between the upper and lower cross members to form two reinforced end walls.

4. The structure according to claim 3, wherein the plurality of wall panels include exterior wall panels, the interior and exterior wall panels forming a double waned panel construction on the sidewalk and end walls.

5. The structure according to claim 4 meeting US Department of State Certification Standard for Forced Entry and Ballistic Resistance of Structural Systems, SD-STD-01.01, Revision G (amended) Apr. 30, 1993.

6. The structure according to claim 4, wherein the interior and exterior wall panels comprise interior single piece wall panels each for one of the sidewalls and end walls and exterior single piece wall panels each for one of the sidewalls and end walls.

7. The structure according to claim 5 having 50% to 75% low quality structural welds.

8. The structure according to claim 5, wherein the structure is an ISO container.

9. The structure according to claim 6, wherein the exterior single piece wall panels are welded to the structure from inside of the structure, and the interior single piece wall panels have the pre-manufactured plug weld openings aligned with the underlying frame structure and are plug welded.

10. The structure according to claim 1, further comprising lower corner members attached to lower ends of the corner posts, and upper corner members attached to upper ends of the corner posts.

11. The structure according to claim 1,
wherein the interior wall panels include the plurality of pre-manufactured plug weld openings specially arranged to be aligned with the four corner posts, two lower side members, two upper side members, two lower cross members, two upper cross members, and vertical strengthening members of the underlying frame structure, into which plug welding is placed to attach the interior wall panels to the four corner posts, two lower side members, two upper side members, two lower cross members, two upper cross members, and vertical strengthening members of the underlying frame structure.

12. A method of manufacturing a hardened trailer structure having blast, ballistic and forced entry resistance properties, the method comprising:
providing a frame assembly comprising four corner posts, two lower side members, two upper side members, two lower cross members, two upper cross members, and a plurality of vertical strengthening members, the lower side member and the upper side member being tubular and comprising openings configured to receive an extended length of the vertical strengthening members into an interior cavity of the lower side member and an interior cavity of the upper side member,
engaging the extended lengths at a top end of the vertical strengthening members each into one opening of said openings and interior cavity of the upper side member,
engaging the extended lengths at a corresponding bottom end of the vertical strengthening members each into one opening of said openings and interior cavity of the lower side member such that the vertical strengthening members have a vertical orientation spanning between the upper and lower side members,
welding said vertical strengthening members to the upper and lower side members to form two reinforced side walls; and
welding a plurality of wall panels to the frame assembly as an underlying frame structure, the wall panels comprising interior wall panels including a plurality of pre-manufactured plug weld openings specially arranged to be aligned with the underlying frame structure, the welding comprising aligning the plurality of pre-manufactured plug weld openings of the interior wall panels with the underlying frame structure into which plug welding is placed to attach the interior wall panels to the underlying frame structure.

13. The method according to claim 12, wherein each reinforced side wall of the two reinforced side walls has at least ten vertical strengthening members and each of said vertical strengthening members is engaged by the welded connection to said upper side member and the welded connection to said lower side member.

14. The method according to claim 12, wherein the upper cross members and the lower cross members further comprise openings configured to receive the extended length of the vertical strengthening members into an interior cavity of the cross member, the method further comprising:

engaging the extended lengths at a top end of the vertical strengthening members each into one opening of said openings and interior cavity of the upper cross members, engaging the extended lengths at a corresponding lower end of the vertical strengthening members each into one opening of said openings and interior cavity of the lower cross members, such that the vertical strengthening members have a vertical orientation spanning between the upper and lower cross members, and welding said vertical strengthening members to the upper and lower cross members to form two reinforced end walls.

15. The method according to claim 14, wherein the plurality or wall panels include exterior wall panels, and wherein the method further comprises using the interior and exterior wall panels to form a structure having a double walled panel construction.

16. The method according to claim 15, wherein the structure meets US Department of State Certification Standard for Forced Entry and Ballistic Resistance of Structural Systems; SD-STD-01,01, Revision G (amended) Apr. 30, 1993.

17. The method according to claim 15, wherein the interior and exterior wall panels comprise interior single piece wall panels each for one of the sidewalls and end walls and exterior single piece wall panels each for one of the sidewalls and end walls.

18. The method according to claim 16, wherein the structure is an ISO container.

19. The method according to claim 17, further comprising welding the exterior single piece wall panels to the underlying frame structure from inside of the structure underlying frame, and plug welding the interior single piece wall panels to the underlying frame structure via the pre-manufactured plug weld openings aligned with the underlying frame structure.

20. The method according to claim 12, wherein the interior wall panels include the plurality of pre-manufactured plug weld openings specially arranged to be aligned with the four corner posts, two lower side members, two upper side members, two lower cross members, two upper cross members, and vertical strengthening members of the underlying frame structure, and wherein the welding comprises aligning the plurality of pre-manufactured plug weld openings of the interior wall panels with the four corner posts, two lower side members, two upper side members, two lower cross members, two upper cross members, and vertical strengthening members of the underlying frame structure into which plug welding is placed to attach the interior wall panels to the underlying frame structure.

\* \* \* \* \*